(12) United States Patent
Lunscher et al.

(10) Patent No.: US 11,649,147 B2
(45) Date of Patent: May 16, 2023

(54) AUTONOMOUS MATERIAL TRANSPORT VEHICLES, AND SYSTEMS AND METHODS OF OPERATING THEREOF

(71) Applicant: CLEARPATH ROBOTICS INC., Kitchener (CA)

(72) Inventors: Nolan Lunscher, Kitchener (CA); Enrique Fernandez Perdomo, Girona (ES); James Servos, Kitchener (CA); Ryan Christopher Gariepy, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 270 days.

(21) Appl. No.: 17/021,406

(22) Filed: Sep. 15, 2020

(65) Prior Publication Data

US 2021/0087031 A1 Mar. 25, 2021

Related U.S. Application Data

(60) Provisional application No. 62/903,292, filed on Sep. 20, 2019.

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G05D 1/0223* (2013.01);
(Continued)

(58) Field of Classification Search
CPC ..... B66F 9/063; B66F 9/0755; G05D 1/0223; G05D 1/0238; G05D 2201/0216; G06N 3/08; G06T 7/10
See application file for complete search history.

(56) References Cited

U.S. PATENT DOCUMENTS 5,581,250 A 12/1996 Khvilivitzky
5,700,074 A 12/1997 Sugimoto et al.
(Continued)

OTHER PUBLICATIONS

Xiao et al., Pallet recognition and localization using an RGB-D camera, Sep. 13, 2017, International Journal of Advanced Robotic Systems, (Year: 2017).*

*Primary Examiner* — Tyler J Lee
*Assistant Examiner* — Yufeng Zhang

(57) ABSTRACT

The various embodiments described herein generally relate to an autonomous material transport vehicle, and systems and methods for operating an autonomous material transport vehicle. The autonomous material transport vehicle comprises: a sensing system operable to monitor an environment of the vehicle; a drive system for operating the vehicle; a processor operable to: receive a location of a load; initiate the drive system to navigate the vehicle to the location; following initiation of the drive system, operate the sensing system to monitor for one or more objects within a detection range; and in response to the sensing system detecting the one or more objects within the detection range, determine whether the load is within the detection range; and when the load is within the detection range, operate the drive system to position the vehicle for transporting the load, otherwise, determine a collision avoidance operation to avoid the one or more objects.

20 Claims, 15 Drawing Sheets

(51) Int. Cl.
  *G05D 1/02* (2020.01)
  *G06T 7/10* (2017.01)
  *G06N 3/08* (2023.01)
(52) U.S. Cl.
  CPC ............ *G05D 1/0238* (2013.01); *G06N 3/08* (2013.01); *G06T 7/10* (2017.01); *G05D 2201/0216* (2013.01)

(56) References Cited

U.S. PATENT DOCUMENTS

| | | | |
|---|---|---|---|
| 5,785,281 | A | 7/1998 | Peter et al. |
| 5,806,938 | A | 9/1998 | Stumpe et al. |
| 5,983,161 | A | 11/1999 | Lemelson et al. |
| 6,405,132 | B1 | 6/2002 | Breed et al. |
| 9,102,406 | B2 | 8/2015 | Stark et al. |
| 9,141,109 | B1 | 9/2015 | Kamata |
| 9,187,088 | B1 | 11/2015 | Ferguson et al. |
| 9,383,753 | B1 | 7/2016 | Templeton et al. |
| 9,442,487 | B1 | 9/2016 | Ferguson et al. |
| 9,671,791 | B1 | 6/2017 | Paczan |
| 9,779,314 | B1 | 10/2017 | Wendel et al. |
| 9,896,030 | B2 | 2/2018 | Sugimoto |
| 10,019,008 | B2 | 7/2018 | Kong et al. |
| 10,328,942 | B2 | 6/2019 | Kelly et al. |
| 10,446,034 | B2 | 10/2019 | Akamine et al. |
| 2002/0013651 | A1 | 1/2002 | Weiberle et al. |
| 2004/0204803 | A1 | 10/2004 | Matsuda et al. |
| 2005/0023052 | A1 | 2/2005 | Beck et al. |
| 2007/0106473 | A1 | 5/2007 | Bodin et al. |
| 2008/0018472 | A1 | 1/2008 | Dasilva |
| 2008/0106886 | A1* | 5/2008 | Sugimoto ............... B60Q 1/122 362/37 |
| 2009/0210109 | A1 | 8/2009 | Ravenscroft |
| 2009/0222134 | A1 | 9/2009 | Franke et al. |
| 2011/0015844 | A1 | 1/2011 | Perkins et al. |
| 2011/0021310 | A1 | 1/2011 | Kresse et al. |
| 2012/0310466 | A1 | 12/2012 | Fairfield et al. |
| 2013/0142393 | A1 | 6/2013 | Lord et al. |
| 2013/0144480 | A1 | 6/2013 | Kobayashi et al. |
| 2013/0197760 | A1* | 8/2013 | Castaneda ........... B66F 9/07568 701/41 |
| 2013/0253770 | A1 | 9/2013 | Nishikawa et al. |
| 2013/0311075 | A1 | 11/2013 | Tran et al. |
| 2014/0214255 | A1 | 7/2014 | Dolgov et al. |
| 2014/0277888 | A1 | 9/2014 | Dastoor et al. |
| 2015/0046034 | A1 | 2/2015 | Kikuchi |
| 2015/0161872 | A1 | 6/2015 | Beaulieu et al. |
| 2015/0239442 | A1 | 8/2015 | Yamakado |
| 2015/0251658 | A1 | 9/2015 | Kato |
| 2015/0266487 | A1 | 9/2015 | Kato |
| 2015/0269860 | A1 | 9/2015 | Shaw et al. |
| 2015/0291210 | A1 | 10/2015 | Kageyama |
| 2016/0001775 | A1 | 1/2016 | Wilhelm et al. |
| 2016/0059851 | A1 | 3/2016 | Klier et al. |
| 2016/0068267 | A1 | 3/2016 | Liu et al. |
| 2016/0093210 | A1 | 3/2016 | Bonhomme |
| 2016/0193999 | A1 | 7/2016 | Sasabuchi |
| 2016/0250930 | A1 | 9/2016 | Collins et al. |
| 2016/0304198 | A1 | 10/2016 | Jourdan |
| 2016/0318445 | A1 | 11/2016 | Sugimoto |
| 2017/0036771 | A1 | 2/2017 | Woodman et al. |
| 2017/0076616 | A1 | 3/2017 | Kanade et al. |
| 2017/0102241 | A1 | 4/2017 | Paduano et al. |
| 2017/0158178 | A1 | 6/2017 | Kerber et al. |
| 2017/0188510 | A1 | 7/2017 | Einecke et al. |
| 2017/0253241 | A1 | 9/2017 | Filev et al. |
| 2017/0355360 | A1 | 12/2017 | Reed et al. |
| 2018/0162349 | A1 | 6/2018 | Chang et al. |
| 2018/0211536 | A1 | 7/2018 | Akamine et al. |
| 2018/0264950 | A1 | 9/2018 | Yokoyama et al. |
| 2018/0297585 | A1 | 10/2018 | Lian et al. |
| 2018/0339701 | A1* | 11/2018 | Kwon .................. B60W 10/04 |
| 2019/0092347 | A1 | 3/2019 | Kim |
| 2019/0120951 | A1 | 4/2019 | Fischer |
| 2019/0202465 | A1 | 7/2019 | Kato et al. |
| 2019/0294167 | A1 | 9/2019 | Kutila et al. |
| 2019/0344796 | A1 | 11/2019 | Lian et al. |
| 2020/0239242 | A1* | 7/2020 | Hoofard ............... G05D 1/0225 |
| 2020/0284601 | A1 | 9/2020 | Myers et al. |

\* cited by examiner

AUTONOMOUS MATERIAL TRANSPORT VEHICLES, AND SYSTEMS AND METHODS OF OPERATING THEREOF

CROSS-REFERENCE TO RELATED APPLICATIONS

This application claims the benefit of priority from U.S. Provisional Patent Application No. 62/903,292, filed 20 Sep. 2019 and entitled "AUTONOMOUS MATERIAL TRANSPORT VEHICLES, AND SYSTEMS AND METHODS OF OPERATING THEREOF". The contents of the foregoing are hereby incorporated by reference.

FIELD

The described embodiments relate generally to material transport vehicles, and systems and methods of operating thereof.

BACKGROUND

Autonomous vehicles are increasingly used for various different applications. On roads, for example, autonomous vehicles include self-driving cars, and in industrial environments, autonomous vehicles include autonomous material-transport vehicles. As autonomous vehicles become more common, there is an increasing need for operational safety precautions, such as preventing collisions between autonomous vehicles themselves, as well as preventing collisions as between autonomous vehicles and its environment, such as objects and/or pedestrians.

SUMMARY

The various embodiments described herein generally relate to material transport vehicles and methods (and associated systems configured to implement the methods) for operating material transport vehicles.

In accordance with some embodiments, there is provided an autonomous material transport vehicle. The autonomous material transport vehicle comprises: a sensing system operable to monitor an environment of the vehicle; a drive system for operating the vehicle; a processor in communication with the sensing system and the drive system, the processor operable to: receive a location of a load; initiate the drive system to navigate the vehicle to the location; following initiation of the drive system, operate the sensing system to monitor for one or more objects within a detection range; and in response to the sensing system detecting the one or more objects within the detection range, determine whether the load is within the detection range; and when the load is within the detection range, operate the drive system to position the vehicle for transporting the load, otherwise, determine a collision avoidance operation to avoid the one or more objects.

In some embodiments, the processor is operable to terminate power supply to the drive system to avoid the one or more objects.

In some embodiments, the processor is operable to stop the drive system from navigating the vehicle in order to avoid the one or more objects.

In some embodiments, the processor is operable to determine an avoidance maneuver that avoids the one or more object.

In some embodiments, the avoidance maneuver comprises an alternative path to the location.

In some embodiments, the processor is operable to adjust an operating speed of the vehicle to accommodate the determination of the avoidance maneuver.

In some embodiments, the processor is operable to: determine a depth and an angular sweep for the detection range.

In some embodiments, the processor is operable to: determine an operating speed of the vehicle; and define the detection range based at least on the operating speed of the vehicle.

In some embodiments, the detection range comprises two or more regions.

In some embodiments, the processor is operable to: initiate the sensing system to collect image data of the environment of the vehicle following initiation of the drive system; and determine from the collected image data whether the load is within the detection range.

In some embodiments, the processor is operable to: conduct image segmentation to the collected image data to determine whether the load is within the detection range.

In some embodiments, the processor is operable to: conduct the image segmentation based on a load dataset developed from applying a neural network to a load training dataset related to the load, the load dataset being stored in a data storage accessible by the processor.

In some embodiments, the processor is operable to: determine the load is within the detection range based on a location of the vehicle.

In some embodiments, the processor is operable to position the vehicle for transporting the load by: operating the sensing system to collect image data of the environment of the vehicle; conducting image segmentation on the collected image data to identify the load; and determining a load receiving maneuver for positioning the vehicle into a load receiving position based on the segmented image data of the load.

In some embodiments, the processor is operable to: conduct the image segmentation based on a load dataset developed from applying a neural network to a load training dataset related to the load, the load dataset being stored in a data storage accessible by the processor.

In some embodiments, the processor comprises a vehicle processor and a sensing processor operationally independent from the vehicle processor, the sensing processor being operable to monitor for the one or more objects within the detection range and to determine the collision avoidance operation to avoid the one or more objects.

In some embodiments, the sensing processor is operable to control the drive system when determining the collision avoidance operation, and to return control of the drive system to the vehicle processor when the collision avoidance operation is complete.

In some embodiments, the sensing system comprises at least one optical sensor. In some embodiments, the sensing system comprises at least one time of flight sensor.

In some embodiments, the vehicle comprises a forklift.

In accordance with some embodiments, there is provided a method of operating an autonomous material transport vehicle comprising a processor in communication with a sensing system and a drive system. The method involves operating the processor to: receive a location of a load; initiate the drive system to navigate to the location; following initiation of the drive system, operate the sensing system to monitor for one or more objects within a detection range; and in response to the sensing system detecting the one or more objects within the detection range, determine whether the load is within the detection range; and when the load is within the detection range, operate the drive system to position the vehicle for transporting the load, otherwise, determine a collision avoidance operation to avoid the one or more objects.

In some embodiments, the method further involves operating the processor to terminate power supply to the drive system to avoid the one or more objects.

In some embodiments, the method further involves operating the processor to stop the drive system from navigating the vehicle in order to avoid the one or more objects.

In some embodiments, the method further involves operating the processor to determine an avoidance maneuver that avoids the one or more object.

In some embodiments, the avoidance maneuver comprises an alternative path to the location.

In some embodiments, the method further involves operating the processor to adjust an operating speed of the vehicle to accommodate the determination of the avoidance maneuver.

In some embodiments, the method further involves operating the processor to determine a depth and an angular sweep for the detection range.

In some embodiments, the method further involves operating the processor to determine an operating speed of the vehicle and define a detection range based at least on the operating speed of the vehicle.

In some embodiments, the detection range comprises two or more regions.

In some embodiments, the method further involves operating the processor to: initiate the sensing system to collect image data of the environment of the vehicle following initiation of the drive system; and determine from the collected image data whether the load is within the detection range.

In some embodiments, the method further involves operating the processor to conduct image segmentation to the collected image data to determine whether the load is within the detection range.

In some embodiments, the method further involves operating the processor to conduct the image segmentation based on a load dataset developed from applying a neural network to a load training dataset related to the load, the load dataset being stored in a data storage accessible by the processor.

In some embodiments, the method further involves operating the processor to determine that the load is within the detection range based on a location of the vehicle.

In some embodiments, the method further involves operating the processor to: operate the sensing system to collect image data of the environment of the vehicle; conduct image segmentation on the collected image data to identify the load; and determine a load receiving maneuver for positioning the vehicle into a load receiving position based on the segmented image data of the load.

In some embodiments, the method further involves operating the processor to conduct the image segmentation based on a load dataset developed from applying a neural network to a load training dataset related to the load, the load dataset being stored in a data storage accessible by the processor.

In some embodiments, the processor comprises a vehicle processor and a sensing processor operationally independent from the vehicle processor, and the method further comprises operating the sensing processor to monitor for the one or more objects within the detection range and determine the collision avoidance operation to avoid the one or more objects.

In some embodiments, the method further involves operating the sensing processor to control the drive system when determining the collision avoidance operation, and return control of the drive system to the vehicle processor when the collision avoidance operation is complete.

In some embodiments, the sensing system comprises at least one optical sensor.

In some embodiments, the sensing system comprises at least one time of flight sensor.

In some embodiments, the vehicle comprises a forklift.

In accordance with some embodiments, there is provided a non-transitory computer readable medium having instructions stored therein executable to cause a processor of an autonomous material transport vehicle to: receive a location of a load; initiate a drive system, in communication with the processor, to navigate to the location; following initiation of the drive system, operate a sensing system, in communication with the processor, to monitor for one or more objects within a detection range; and in response to the sensing system detecting the one or more objects within the detection range, determine whether the load is within the detection range; and when the load is within the detection range, operate the drive system to position the vehicle for transporting the load, otherwise, determine a collision avoidance operation to avoid the one or more objects.

BRIEF DESCRIPTION OF THE DRAWINGS

Several embodiments will now be described in detail with reference to the drawings, in which.

Figure 1:
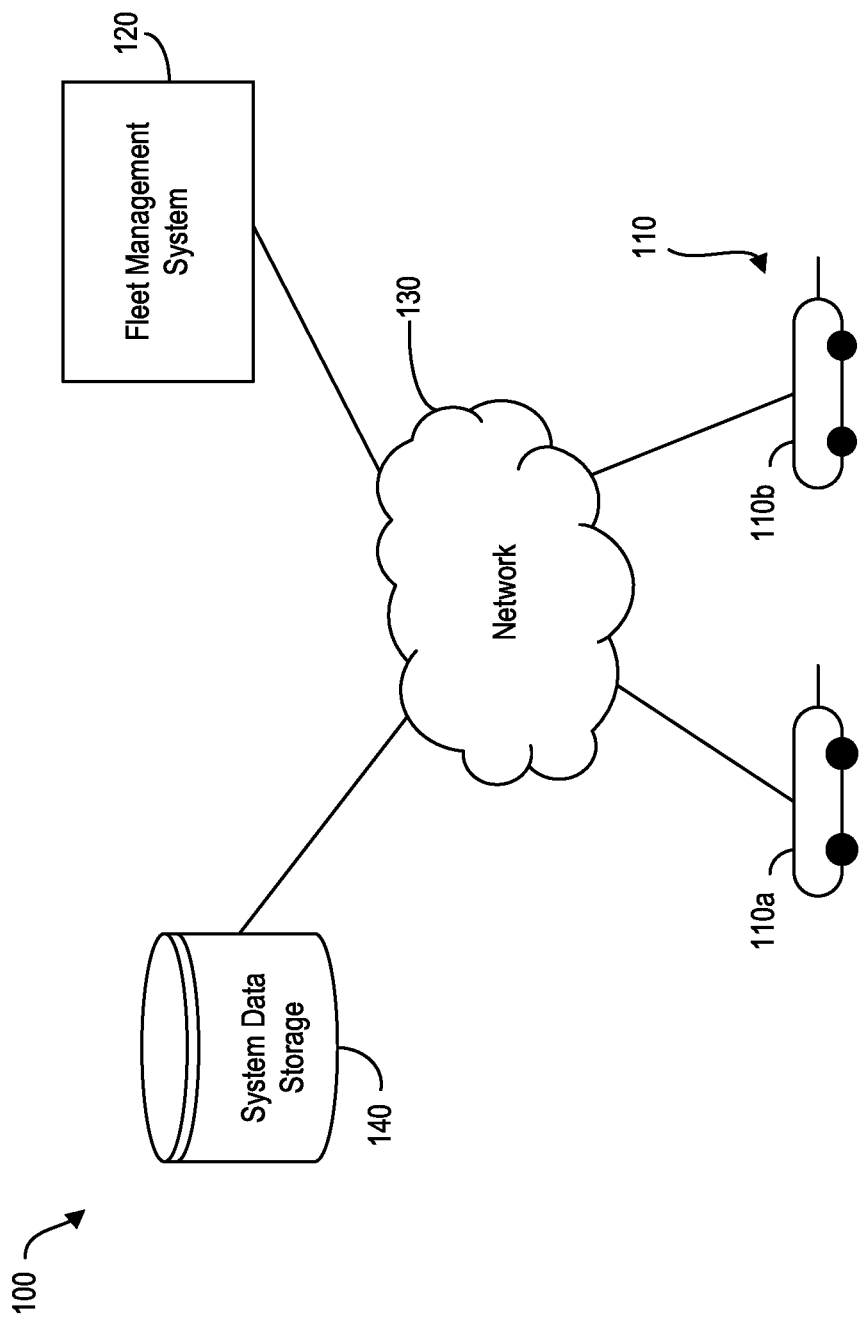
FIG. 1 is a block diagram illustrating example autonomous material transport vehicles in communication with example components, according to an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

In contrast with traditional human-operated material transport vehicles, autonomous material transport vehicles face different operating challenges. For example, during operation, autonomous material transport vehicles need to navigate with reference to obstacles within the environment. The obstacles can include fixtures (e.g., stationary objects) or non-permanent objects that are movable (e.g., mobile shelves, objects placed temporarily at a location, or humans). Autonomous material transport vehicles are faced with the challenge of navigating around such environments, and also, the challenge of being able to distinguish between these objects. That is, autonomous material transport vehicles need to operate to avoid objects that are obstacles and to identify and position themselves with respect to intended targets.

Referring now to FIG. 1, which shows a block diagram 100 illustrating example autonomous material transport vehicles 110 in communication with example components. As shown in FIG. 1, the autonomous material transport vehicles 110 can be in communication with a fleet management system 120 and a system data storage 140 via a network 130.

The autonomous material transport vehicles 110 in FIG. 1 include example vehicles 110a, 110b for illustrative purposes. Fewer or more autonomous material transport vehicles 110 can be included. The autonomous material transport vehicles 110 can operate to pick up, transport, and/or drop off materials at various locations. For example, the autonomous material transport vehicles 110 can include autonomous material transports.

The network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the autonomous material transport vehicles 110, the fleet management system 120 and/or the system data storage 140. In some embodiments, the autonomous material transport vehicles 110 can communicate with each other via the network 130. For example, vehicle 110a can communicate with vehicle 110b via the network 130. In some embodiments, vehicle 110a can communicate with vehicle 110b directly via onboard communication components.

The system data storage 140 can store data related to the autonomous material transport vehicles 110 and/or the fleet management system 120. The system data storage 140 can include RAM, ROM, one or more hard drives, one or more flash drives or some other suitable data storage elements such as disk drives, etc.

For example, the system data storage 140 can also store electronic maps related to the operating environment of the autonomous material transport vehicles 110. The electronic maps located on system data storage 140 can be accessible for download, via the network 130, by the fleet management system 120 and the autonomous material transport vehicles 110. In some embodiments, the electronic map can be generated and updated by the fleet management system 120 based on information received from the autonomous material transport vehicles 110. In some embodiments, the system data storage 140 can be located at the fleet management system 120.

The illustrated FIG. 1 includes the fleet management system 120. The fleet management system 120 can operate to direct and/or monitor the operation of the autonomous material transport vehicles 110. In some embodiments, the autonomous material transport vehicles 110 can operate within a decentralized network—without, or at least with minimal, involvement of the fleet management system 120.

The fleet management system 120 can include a processor, a data storage, and a communication component (not shown). For example, the fleet management system 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the fleet management system 120 can be provided over a wide geographic area and connected via the network 130.

The processor of the fleet management system 120 can include any suitable processors, controllers or digital signal processors that can provide sufficient processing power depending on the configuration, purposes and requirements of the fleet management system 120. In some embodiments, the processor can include more than one processor with each processor being configured to perform different dedicated tasks.

The data storage of the fleet management system 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the fleet management system 120 can include any interface that enables the fleet management system 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the fleet management system 120.

In some embodiments, the fleet management system 120 can generate commands for the autonomous material transport vehicles 110. For example, the fleet management system 120 can generate and transmit navigational commands to the autonomous material transport vehicles 110. The navigational commands can direct the autonomous material transport vehicles 110 to navigate to one or more destination locations located within the operating environment of the autonomous material transport vehicles 110. For example, the destination locations can correspond to locations where the autonomous material transport vehicles 110 are required to pick up or drop off loads.

In some embodiments, the fleet management system 120 can transmit only the destination locations to the autonomous material transport vehicles 110 and the autonomous material transport vehicles 110 can then navigate themselves to the destination locations. The fleet management system 120 can transmit the destination locations in various formats, such as, but not limited to, a set of Global Positioning System (GPS) coordinates, or coordinates defined relative to an electronic map accessible to the autonomous material transport vehicles 110 and the fleet management system 120. The destination locations, in some embodiments, can be identified with respect to known objects or landmarks within the operating environment of the autonomous material transport vehicles 110. For example, the autonomous material transport vehicles 110 can identify the location of the object or landmark on an electronic map, and navigate to the object or landmark.

The fleet management system 120 can also transmit action commands to the autonomous material transport vehicles 110. Action commands can define an action that the autonomous material transport vehicles 110 are required to perform at a destination location, for example. An example action command can indicate that the autonomous material transport vehicles 110a is to pick up a load at a first destination location, and drop off the load at a second destination location. When the action command requires the autonomous material transport vehicles 110a to pick up a load, the fleet management system 120 can include information about the load within the action command, such as image data or text data associated with the load. The image data can include an image of the load and the text data can include load descriptions, such as dimensions, color, size, and/or weight. The image and text data can assist the autonomous material transport vehicles 110 with identifying the load.

The fleet management system 120 can also receive data from the autonomous material transport vehicles 110. For example, the autonomous material transport vehicles 110 can transmit operating data about objects identified during its operation that appear inconsistent with the electronic map. The fleet management system 120 can receive the operating data and update the electronic map, as necessary. In the case that the identified object is obstructing the operation of the autonomous material transport vehicles 110, the fleet management system 120 can transmit updated navigation commands to the autonomous material transport vehicles 110 to guide the autonomous material transport vehicles 110 around the object.

Figure 2:
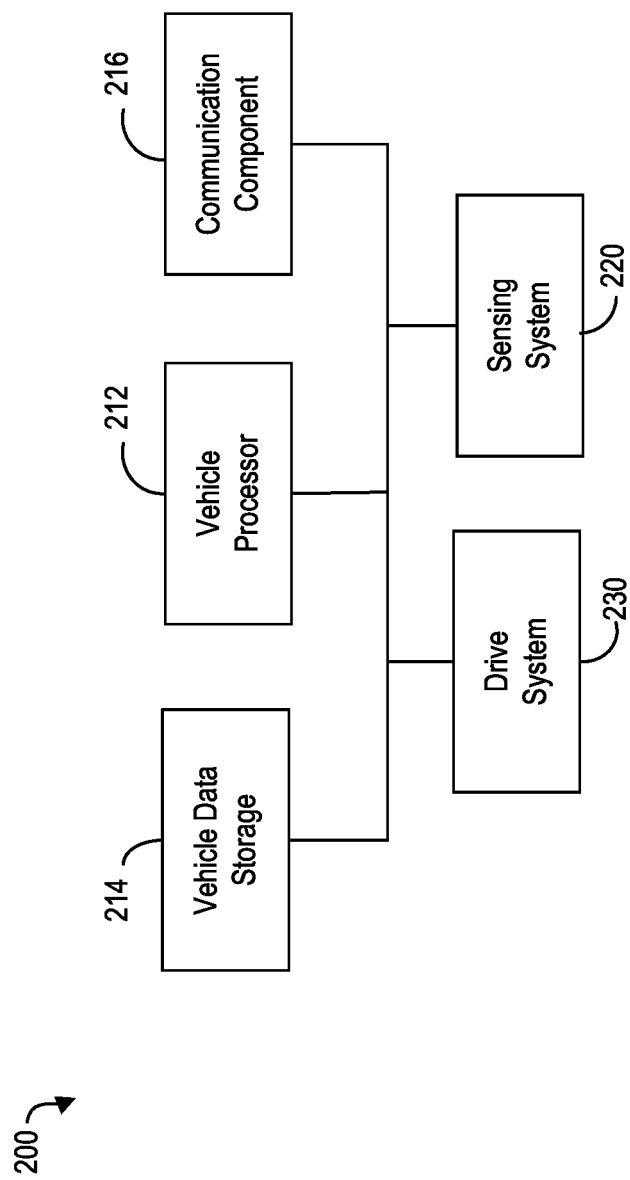
FIG. 2 is a block diagram of example components of an example autonomous material transport vehicle.

Reference is now made to FIG. 2, which illustrates a block diagram 200 of an example autonomous material transport vehicle 110.

The autonomous material transport vehicle 110 can include a vehicle processor 212, a vehicle data storage 214, a communication component 216, a sensing system 220, and a drive system 230. Components 212, 214, 216, 220, and 230 are illustrated separately in FIG. 2, for ease of exposition. In some embodiments, one or more of the components 212, 214, 216, 220, and 230 can be combined into fewer components, or separated into further components. In some embodiments, parts of a component can be combined with another part of another component.

The vehicle processor 212 can include any suitable processor, controller or digital signal processor that can provide sufficient processing power depending on the configuration, purposes and requirements of the autonomous material transport vehicle 110. In some embodiments, the vehicle processor 212 can include more than one processor with each processor being configured to perform different dedicated tasks.

The vehicle processor 212 can operate the vehicle data storage 214, the communication component 216, the sensing system 220, and the drive system 230. For example, the vehicle processor 212 can operate the drive system 230 to navigate to the destination location as identified by the fleet management system 120. The vehicle processor 212 can also control the vehicle data storage 214, the communication component 216, the sensing system 220, and the drive system 230, as necessary, to implement the action commands received from the fleet management system 120. The operation of the vehicle processor 212 can be based on data collected from the vehicle data storage 214, the communication component 216, the sensing system 220, and/or drive system 230, in some embodiments.

The vehicle data storage 214 can include can include RAM, ROM, one or more hard drives, one or more flash drives or some other suitable data storage elements such as disk drives, etc. For example, the vehicle data storage 214 can include volatile and non-volatile memory. Non-volatile memory can store computer programs consisting of computer-executable instructions, which can be loaded into the volatile memory for execution by the vehicle processor 212. Operating the vehicle processor 212 to carry out a function can involve executing instructions (e.g., a software program) that can be stored in the vehicle data storage 214 and/or transmitting or receiving inputs and outputs via the communication component 216. The vehicle data storage 214 can also store data input to, or output from, the vehicle processor 212, which can result from the course of executing the computer-executable instructions for example.

In some embodiments, the vehicle data storage 214 can store data related to the operation of the autonomous material transport vehicle 110, such as one or more electronic maps of its operating environment and/or operating parameters. The vehicle data storage 214 can store data tables, data processing algorithms (e.g., image processing algorithms), as well as other data and/or operating instructions which can be used by the vehicle processor 212. The vehicle processor 212 can operate to process data received from the sensing system 220.

The communication component 216 can include any interface that enables the autonomous material transport vehicle 110 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g. using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the autonomous material transport vehicle 110. For example, the communication component 216 can receive commands and/or data from the fleet management system 120 and/or another autonomous vehicle (e.g., another autonomous vehicle operating within the operating environment).

The communication component 216 can receive information about obstacles and/or unexpected objects located in the vehicle's operating environment directly from other autonomous vehicles within the same operating environment and/or indirectly via the fleet management system 120. The vehicle processor 212 can update an electronic map stored in the vehicle data storage 214 with this information, for example. The vehicle processor 212 may also transmit, via the communication component 216 for example, information related to obstacles and/or unexpected objects identified in its operating environment to other autonomous vehicles directly or indirectly via the fleet management system 120.

The sensing system 220 can monitor the environment of the autonomous material transport vehicle 110. The sensing system 220 can include one or more sensors for capturing information related to the environment. The information captured by the sensing system 220 can be applied for various purposes, such as localization, navigation and/or mapping. For example, the sensing system 220 can include optical sensors equipped with depth perception capabilities, infrared (IR) capabilities, or sonar capabilities. The optical sensors can include imaging sensors (e.g., photographic and/or video cameras), and range-finding sensors (e.g., time of flight sensors, Light Detection and Ranging (LiDAR) devices which generate and detect reflections of pulsed laser from objects proximal to the autonomous material transport vehicle 110, etc.). The sensing system 220 can also include navigational sensors, such as ground positioning system (GPS) sensors, as well as sensors that detect guiding infrastructure installed within the operating environment. Example sensors that detect guiding infrastructure can include, but not limited to, magnetic sensors that detect magnetic tape within a facility warehouse, and/or optical sensors that detect visual navigational indicators within the operating environment.

In some embodiments, the sensing system 220 can include a sensing processor that receives data collected by the sensors and processes the collected data. The sensing processor can operate independently from the vehicle processor 212. In some other embodiments, the sensing system 220 can receive the data collected by the sensors and transmit the collected data to the vehicle processor 212 for further processing.

The vehicle processor 212 can receive the data collected by the sensing system 220, and can apply the collected data to assist with navigating the autonomous material transport vehicle 110 within its operating environment. For example, the vehicle processor 212 can receive environment data from the sensing system 220 in respect of the environment (e.g., a landmark) and can cross-reference the received environment data against the electronic map to assist with localizing the autonomous material transport vehicle 110 and to navigate the autonomous material transport vehicle 110 accordingly. The vehicle processor 212 can also use data collected by the sensing system 220 to determine locations for load pick-up and drop-off. For example, the sensing system 220 can collect data related to visual markers associated with pick-up and drop-off locations. The sensing system 220 can then transmit the collected data to the vehicle processor 212 for processing, or can determine the associated location before transmitting the location data to the vehicle processor 212. Example visual indicators can include, but not limited to, corner tape or graphic patterns placed on the ground for identifying the pick-up or drop-off location. In some examples, the sensing system 220 can include optical sensors and/or LiDAR sensors operable for detecting the visual indicators.

The sensing system 220 can also assist the vehicle processor 212 with executing action commands, such as those received from the fleet management system 120. For example, when executing the action command related to a load pick-up, the sensing system 220 can operate to collect image data related to the environment of the autonomous material transport vehicle 110 to assist the vehicle processor 212 with identifying the load and orienting with respect to the load for the pick-up.

In some embodiments, the sensing system 220 can be operated to monitor the operating environment of the autonomous material transport vehicle 110 for the purpose of minimizing and/or avoiding collisions.

The sensing system 220 can include sensors dedicated for collision avoidance, in some embodiments, or can use existing sensors within the sensing system 220 can be used for collision avoidance. In contrast with sensor data required for localization, navigation and/or mapping, the sensor data required for collision avoidance can be lower resolution. For example, sensors such as LiDAR devices and time-of-flight sensors can generate robust signals that can be quickly transmitted and processed, which can be important for collision avoidance. In some embodiments, the vehicle processor 212 can use the data collected from the sensing system 220 for avoidance detection, even though the sensor data may be higher-resolution and requires more processing time.

As will be described in further detail, the vehicle processor 212 can operate the sensing system 220 to detect an obstacle within the operating environment. In response to detecting the obstacle, the vehicle processor 212 can implement a collision avoidance operation to minimize, or prevent, a collision between the autonomous material transport vehicle 110 and the detected obstacle. Examples of collision avoidance operations can include, but not limited to, controlling the drive system 230 to immediately stop the vehicle, cutting power to the vehicle motor, or avoidance steering.

The sensing system 220 can also include the sensing processor, in some embodiments, to assist with collision avoidance. For example, the sensing processor can receive data collected by the sensors to determine whether a collision is imminent and operate one or more collision avoidance operations. The sensing processor can include a low-level processor, such as a programmable logic controller (PLC). The sensing processor can receive and process low-level signals generated by the sensors, and in turn, can transmit low-level output logic signals to control the drive system 230 to implement a collision avoidance operation. With a low-level processor, the time required for detecting the collision can be improved to facilitate quick responses (in contrast to the vehicle processor 212, which is a more complex processor as it needs to execute instructions related to autonomous navigation and other operations).

The drive system 230 can include the components required for steering and driving the autonomous material transport vehicle 110. For example, the drive system 230 can include the steering component and drive motor.

Figure 3:
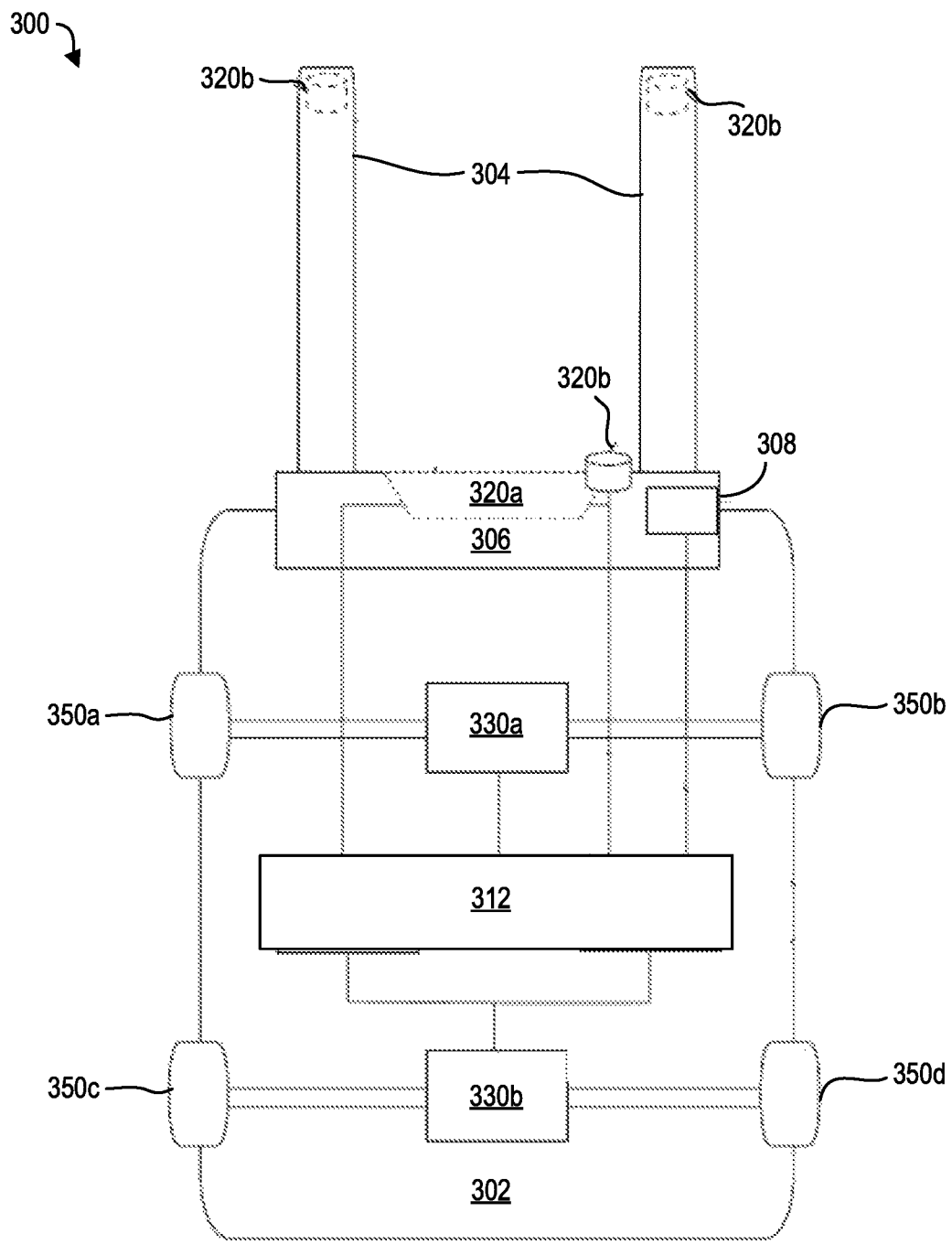
FIG. 3 is a schematic diagram of an example autonomous material transport vehicle, according to some example embodiments.

Reference will now be made to FIG. 3, which is a schematic diagram of an example autonomous material transport vehicle 300.

The autonomous material transport vehicle 300 includes a chassis 302 and a pair of forks 304 connected to the chassis 302. The forks 304 can be used to engage loads or loading platforms for pick-up, transport, and drop-off. For example, forks 304 can engage slots or gaps in a loading platform, such as a shipping pallet or a skid.

The forks 304 are shown extending forwardly from the front end of the chassis 302 in FIG. 3. The forks 304 can also extend from any other location around the chassis 302, including from the rear of the chassis 302. The forks 304 can have any suitable forward length, cross-sectional dimension, and inter-spacing. Any number of forks can be attached to the chassis 302—that is fewer or more forks 304 can be added to the autonomous material transport vehicle 300, as needed.

The forks 304 can be mounted to a fork elevator 306. The fork elevator 306 can raise and lower the forks 304 in order to pick up, drop off, and transport loads. The fork elevator 306 can be driven by the elevator motor 308, such as an electric motor. The fork elevator 306 can have variable maximum lift capacity.

The autonomous material transport vehicle 300 also includes a drive system 330 composed of a drive motor 330b (e.g., an electric motor, a combustion engine, or a combination or hybrid of both an electric and combustion motor/engine) and a steering module 330a. In FIG. 3, the drive motor 330b connects to driving wheels 350c and 350d in order to propel the autonomous material transport vehicle 300 forward or rearward. The steering module 330a, as shown in FIG. 3, is connected to steering wheels 350a and 350b, which are used for steering the autonomous material transport vehicle 300.

While one drive motor 330b is illustrated in FIG. 3, the autonomous material transport vehicle 300 can include more drive motors 330b that are separately connected to each wheel 350. This can allow each wheel 350 of the autonomous material transport vehicle 300 to be driven at a different speed. For example, each wheel 350 can be driven by a separate drive motor 330b.

In some embodiments, the drive system 330 can include a control interface for controlling the drive system 330. For instance, the drive system 330 can include a control interface to allow an operator of the autonomous material transport vehicle 300 to control the wheels 350 at different speeds.

Referring still to FIG. 3, one or more sensors 320 can be mounted to the chassis 302. The sensors 320 can include a sensor 320a for detecting obstacles and optical sensors 320b. The location of the sensors 320 shown on the chassis 302 are for illustrative purposes. Depending on the application of the autonomous material transport vehicle 300, the sensors 320 can be mounted at different locations.

Example sensors 320a for detecting obstacles can include LiDAR devices or time-of-flight sensors. As shown in FIG. 3, the sensor 320a is located at the front-end of the autonomous material transport vehicle 300, and positioned between the forks 304. At this location, the sensor 320a can scan for objects that may enter the path of the autonomous material transport vehicle 300. More sensors 320a can be mounted to the autonomous material transport vehicle 300, in some embodiments. The sensors 230a can be mounted to different locations, such as at different locations of the chassis 302 (e.g., front corner of the chassis 302). Optical sensors 320b can include imaging and/or video cameras, mounted to a forward portion of the chassis 302, as well as at the front end of the forks 304.

The chassis 302 includes a vehicle processor 312 for operating, at least, the drive system 330, the forks 304, and the sensors 320. The vehicle processor 312 is operatively coupled to the elevator motor 308, the sensors 320, and the drive system 330, and can control and receive information from these components.

Figure 4:
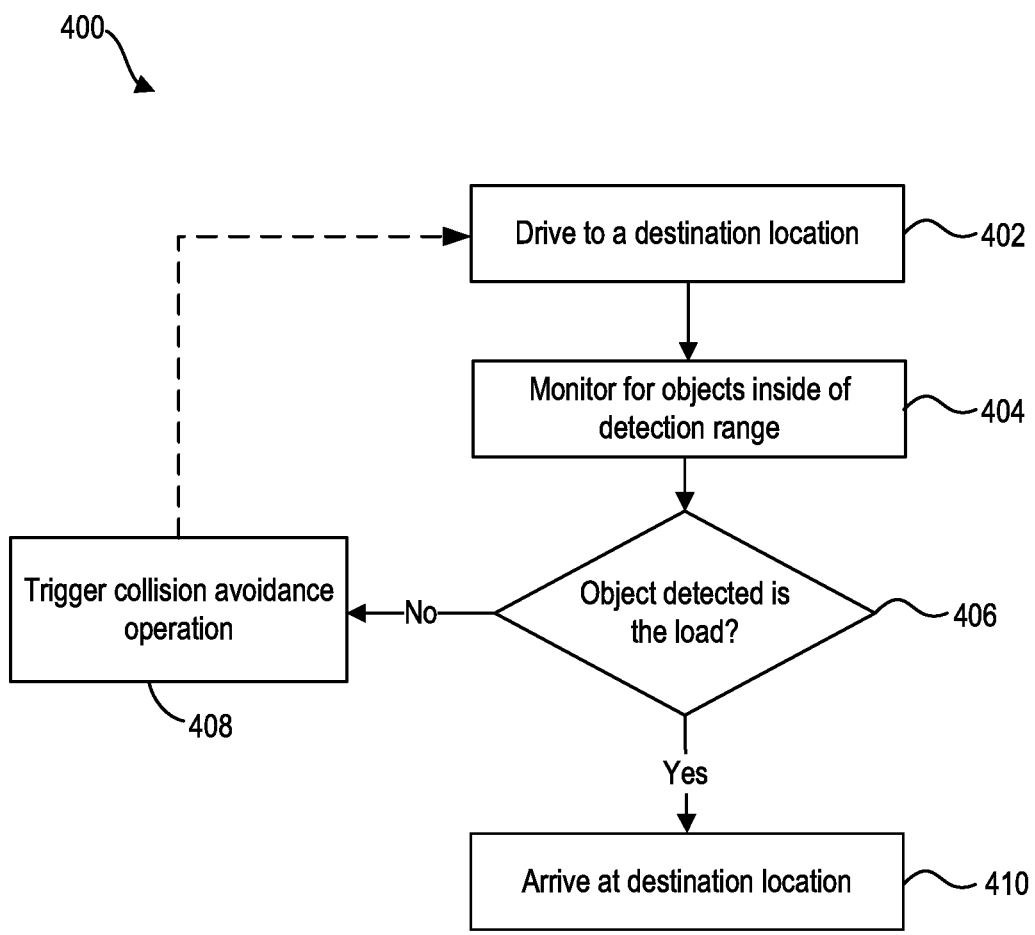
FIG. 4 is a flowchart illustrating an example method for collision avoidance.

Referring now to FIG. 4, which is a flowchart of an example method 400 for collision avoidance. Reference will be made simultaneously to FIGS. 5 and 6, and autonomous material transport vehicle 300 to illustrate the method 400. The method 400 similarly applies to autonomous material transport vehicles 110 described herein.

At 402, the vehicle processor 212 operates the autonomous material transport vehicle 300 within an operating environment towards a destination location. The vehicle processor 212 can apply information collected by the sensing system 220 to autonomously navigate the autonomous material transport vehicle 300 to the destination location. The vehicle processor 212 can initiate the sensing system 220 following initiation of the drive system 230, in some embodiments.

At 404, the vehicle processor 212 operates the sensing system 220 to monitor for unexpected objects within a detection range during operation of the autonomous material transport vehicle 300. The detection range includes an area defined with respect to the autonomous material transport vehicle 300 in which the sensing system 220 monitors for objects that needs to be avoided.

Figure 5A:
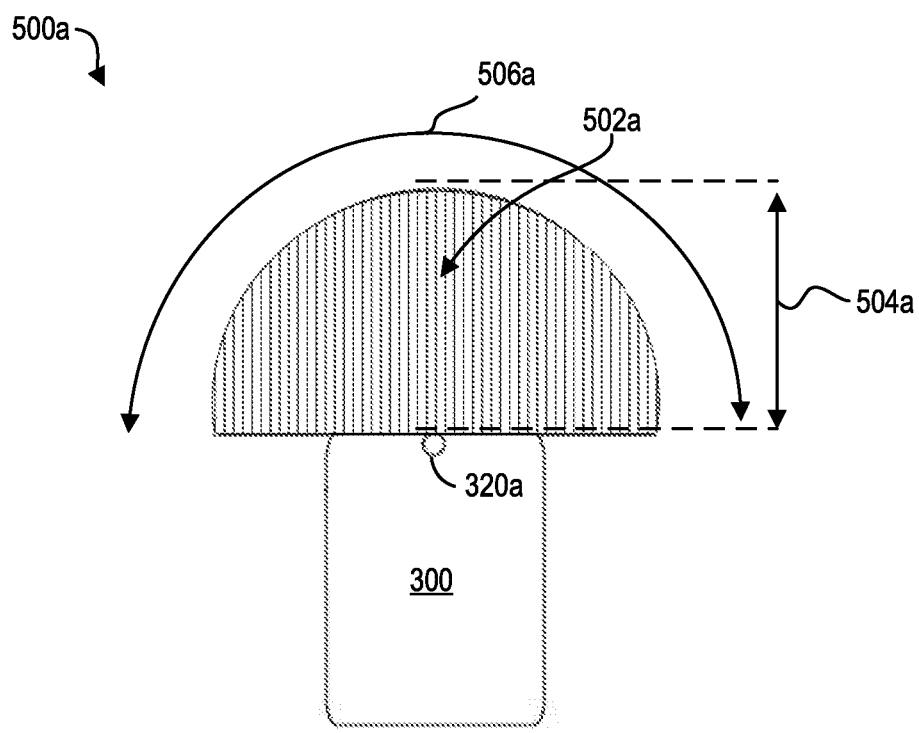
FIG. 5A is a schematic representation of an example detection range for an autonomous material transport vehicle.
Figure 6:
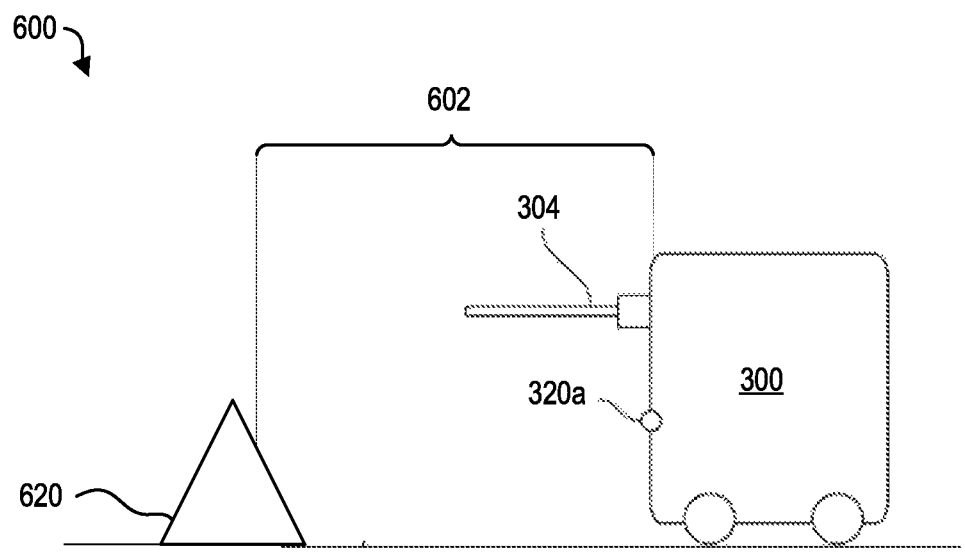
FIG. 6 is a schematic representation of an example autonomous material transport vehicle during an example operation.

FIG. 5A is a schematic representation 500a of an example detection range 502a with respect to the autonomous material transport vehicle 300.

As shown in FIG. 5A, the sensor 320a is located at the front of the autonomous material transport vehicle 300. The detection range 502a is defined with respect to the sensor 320a. The detection range 502a can vary with the type of sensor 320a and/or the operation of the autonomous material transport vehicle 300. In FIG. 5A, the example detection range 502a is defined by a depth 504a (e.g., radius from the sensor 320a) and a width 506a (e.g., angular sweep). In this example, the width 506a is 180°. As the sensor 320a is located at the front of the autonomous material transport vehicle 300, blind spots to the left, right and rear result. Other locations of the sensor 320a can be used, as well as additional sensors 320a can be mounted thereon.

When the sensor 320a includes a LiDAR device, the detection range 502a can represent a predefined scanning range for the LiDAR device. When the sensor 320a includes a depth perception camera, the detection range 502a can represent a predefined depth and field of view for the depth perception camera.

In some embodiments, the vehicle processor 212 can operate to determine the detection range 502a for the autonomous material transport vehicle 300. The vehicle processor 212 can determine the detection range 502a prior to operating the sensing system 220 to monitor for objects, and/or during operation of the autonomous material transport vehicle 300 to vary the detection range 502a. The detection range 502a can vary depending on various factors, such as, but not limited to, the operating environment, the operation of the autonomous material transport vehicle 300, and the type of the autonomous material transport vehicle 300.

For example, the vehicle processor 212 can determine that the autonomous material transport vehicle 300 is conducting an urgent or high risk operation—that is, the autonomous material transport vehicle 300 may be carrying a highly valuable and/or dangerous load, or the operating environment is busy and/or frequently changing. The vehicle processor 212 can then determine that the risk tolerance is low and activate a larger detection range 502b, such as the example schematic representation 500b generally shown in FIG. 5B, so that the sensing system 220 is sensitive to objects located farther from the autonomous material transport vehicle 300. In comparison to the detection range 502a, the detection range 502b has a larger depth 504b but similar width 506b as width 506a. In some embodiments, the vehicle processor 212 can determine that the autonomous material transport vehicle 300 is carrying a load and/or requires additional time for adjusting its operation and can then determine that the detection range 502 needs to be larger, such as 502b.

In some other embodiments, the vehicle processor 212 can determine that the autonomous material transport vehicle 300 is conducting a low risk or lower urgency operation. The autonomous material transport vehicle 300 may not be carrying a load as yet and/or the operating environment may be slow and/or less likely to change. The vehicle processor 212 can then determine that the risk tolerance is high and activate a smaller detection range, such as 502a, so that the sensing system 220 operates to detect objects within a closer proximity to the autonomous material transport vehicle 300. In some embodiments, the vehicle processor 212 can determine that the autonomous material transport vehicle 300 is not yet carrying a load and/or requires minimal time for adjusting its operation and can then determine that the detection range 502 can be smaller, such as 502a.

In some embodiments, the vehicle processor 212 can determine the detection range 502 based on an operating speed of the autonomous material transport vehicle 300. The vehicle processor 212 can determine the operating speed of the autonomous material transport vehicle 300 and determine a stopping distance required for the autonomous material transport vehicle 300 to safely stop. The stopping distance can then be set by the vehicle processor 212 as the detection range 502. In some embodiments, a range of operating speeds can be associated with a detection range 502. For example, the vehicle processor 212 can determine the operating speed of the autonomous material transport vehicle 300 and determine the detection range 502 based on a stopping distance defined for a range of operating speeds. The range of operating speeds and associated detection range 502 can vary with various factors such as, but not limited to, the operating environment, the operation of the autonomous material transport vehicle 300, and/or the type of autonomous material transport vehicle 300.

In some embodiments, the vehicle processor 212 can determine the detection range 502 based on a weight of the autonomous material transport vehicle 300 and/or load it is carrying, if applicable. When the autonomous material transport vehicle 300 is carrying a heavier load, the vehicle processor 212 can determine that a greater detection range 502 is required, compared to a lighter load. In some embodiments, the vehicle processor 212 can determine the weight of the load with the sensing system 220 or from information available from the load itself (e.g., information available from the load packaging and received by the sensing system 220) or from the fleet management system 120.

The vehicle processor 212 can determine the detection range 502 based on a combination of factors, including the operating speed and/or the weight of the autonomous material transport vehicle 300 and/or load, the operating environment, and the operation of the autonomous material transport vehicle 300. For example, factors related to the operation of the autonomous material transport vehicle 300 can include the breaking force, the deceleration speed, and the operating condition of its mechanical and/or electrical components (e.g., age, historical usage, etc.). The vehicle processor 212 can determine the factors related to the operation of the autonomous material transport vehicle 300 with the sensing system 220 and/or from the fleet management system 120. The vehicle processor 212 can also determine the detection range 502 based on the operating environment characteristics. For example, when the operating environment has narrow paths, the vehicle processor 212 can determine that the detection range 502 is smaller to accommodate quicker response to detection of objects. The vehicle processor 212 can determine characteristics of the operating environment from data collected by the sensing system 220 and/or from the fleet management system 120 (e.g., via the electronic map, etc.).

The vehicle processor 212 can also continue to adjust the detection range 502 based on one or more of the factors described herein. For example, the vehicle processor 212 can continue to adjust the detection range 502 as the operating speed of the autonomous material transport vehicle 300 changes during operation.

In some embodiments, the vehicle processor 212 can continue to adjust the detection range 502 during the operation of the autonomous material transport vehicle 300 in response to data received from the sensing system 220 and/or the fleet management system 120, for example. For sensing system 220 with a LiDAR device, the vehicle processor 212 can adjust the range and scan angle of the LiDAR device to adjust the detection range. For sensing system 220 including a camera with depth perception, the vehicle processor 212 can adjust the depth and field of view of the camera to adjust the detection range.

Figure 5B:
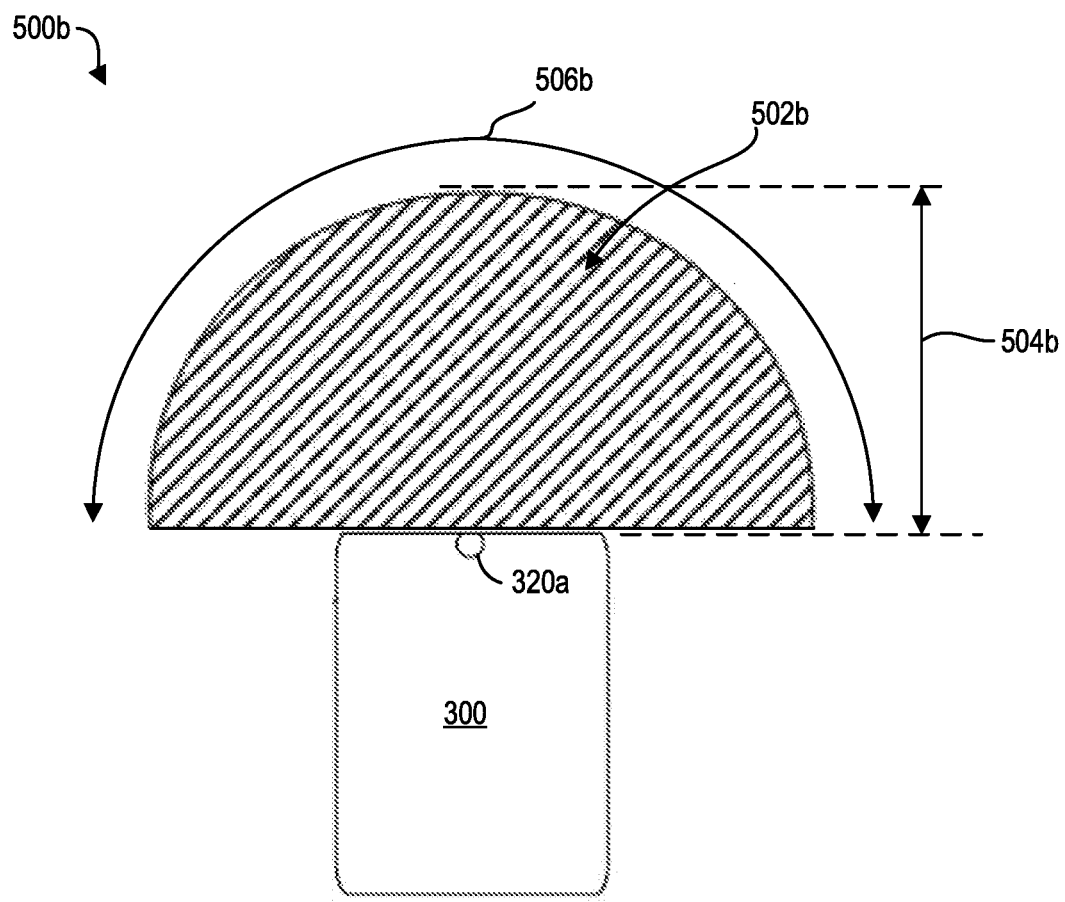
FIG. 5B is a schematic representation of another example detection range for an autonomous material transport vehicle.

The dimensions of the detection ranges 502a and 502b shown generally in FIGS. 5A and 5B are for illustrative purposes and are not intended as limitations.

Continuing with reference to FIG. 4, at 406, when the sensing system 220 indicates that an object is detected within the detection range 502, the vehicle processor 212 can determine the necessary response based on the sensor data from the sensing system 220. FIG. 6 is a schematic representation 600 of an example detection range 602 with respect to the autonomous material transport vehicle 300. As shown in FIG. 6, an object 620 is within a detection range 602 defined with respect to the sensor 320a. The sensor 320a can identify the object 620 is within the detection range 602 and trigger the vehicle processor 212 to respond accordingly.

When the vehicle processor 212 determines that the object 620 detected within the detection range 502 is an obstacle, the vehicle processor 212 proceeds to trigger a collision avoidance operation at 408. When the vehicle processor 212 determines that the object 620 detected within the detection range 502 is the load, the vehicle processor 212 can determine, at 410, that the autonomous material transport vehicle 300 has arrived at its destination location. The vehicle processor 212 can then operate the drive system 330a, 330b to position the autonomous material transport vehicle 300 for transporting the object 620 (load).

Figure 7A:
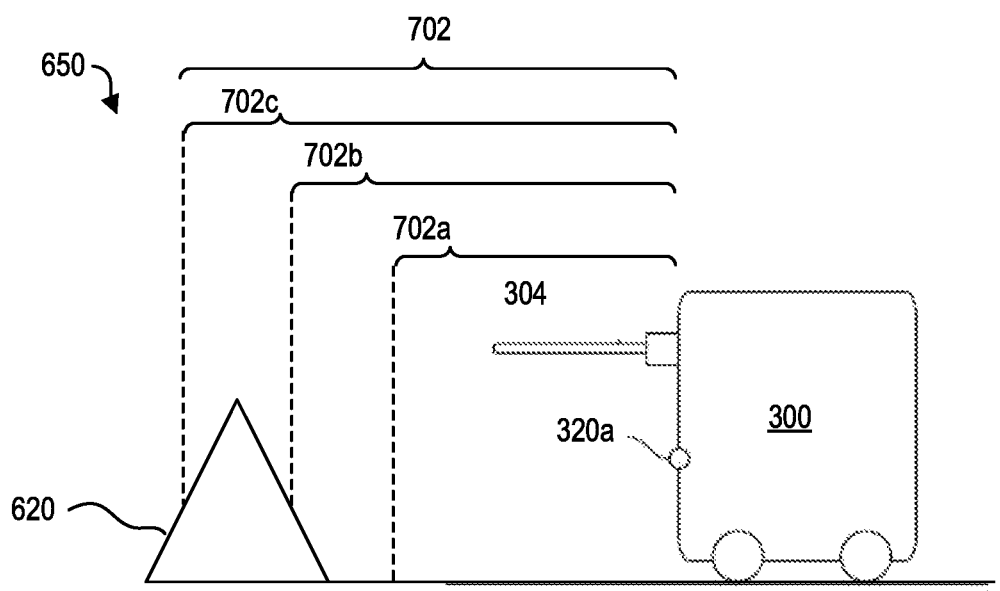
FIG. 7A is a schematic representation of the autonomous material transport vehicle of FIG. 6 operating with multiple detection range regions.
Figure 7B:
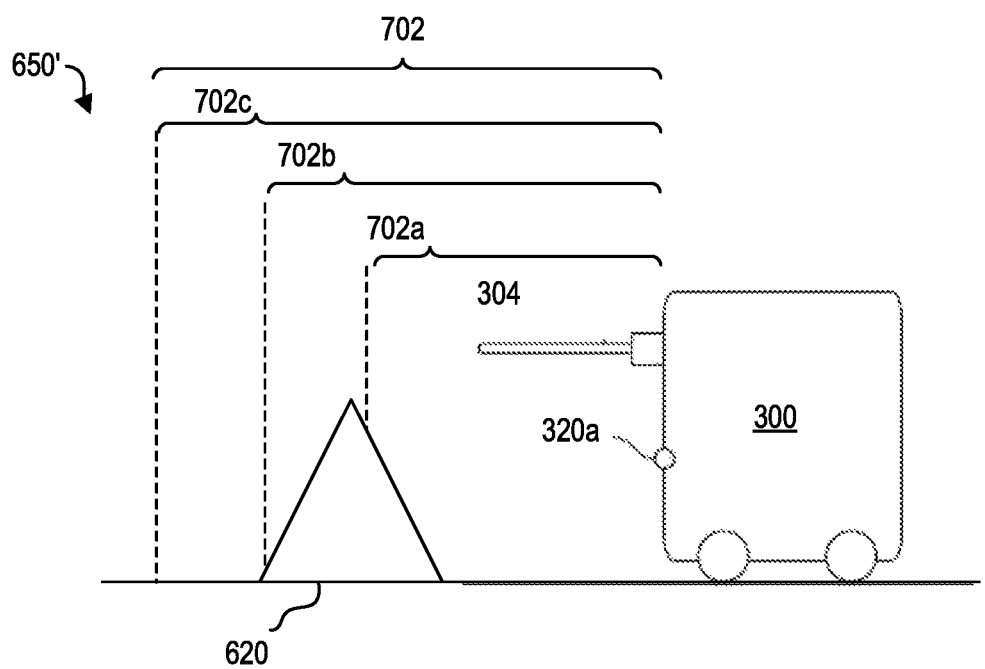
FIG. 7B shows FIG. 7A with the autonomous material transport vehicle at a later stage of operation.

In some embodiments, the detection range 602 can include two or more regions. FIGS. 7A and 7B show example schematic representations 650, 650' of the autonomous material transport vehicle 300 operating with multiple detection range regions 702a, 702b, and 702c.

As shown in FIGS. 7A and 7B, the detection range regions 702a, 702b, and 702c are associated with different depths from the sensor 320a. The detection range region 702c is at the greatest depth from the sensor 320a, the detection range region 702b is at a smaller depth from the sensor 320a than the detection range region 702c but larger depth than the detection range region 702a, and the detection range region 702a is at the smallest depth from the sensor 320a. Depending on which detection range region 702a, 702b, 702c the sensor 302a detects the object 620 is in, the vehicle processor 212 can operate the autonomous material transport vehicle 300 accordingly.

For example, as shown in FIG. 7A, the sensor 320a can determine that the object 620 is within the detection range regions 702a and 702b and can notify the vehicle processor 212 accordingly. In response, the vehicle processor 212 can determine whether the object 620 is the load. If the object 620 is the load, the vehicle processor 212 can proceed to prepare the autonomous material transport vehicle 300 for picking up the load (e.g., operating the drive system 330a, 330b to position the forks 304 relative to the load, and/or initiating the sensing system 220 to collect image data of the environment for positioning the autonomous material transport vehicle 300 relative to the object 620). When the vehicle processor 212 determines that the object 620 is not the load and needs to be avoided, the vehicle processor 212 can trigger the collision avoidance operation associated with the detection range regions 702a and 702b. Since the detection range regions 702a and 702b are farther from the autonomous material transport vehicle 300 than the detection range region 702c, the vehicle processor 212 can trigger collision avoidance operations that can require more time to implement, such as activating the sensing system 220 to collect additional environment information for determining a rerouting maneuver, or for sending to the fleet management system 120 for requesting an updated path based on the additional environment information. In the case that the vehicle processor 212 is unable to operate the autonomous material transport vehicle 300 away from colliding with the object 620, such as the example shown generally at 650' in FIG. 7B in which the autonomous material transport vehicle 300 has continued to move towards the object 620 and the sensor 320a determines that the object 620 is now within the detection range region 702a, the vehicle processor 212 can trigger more immediate collision avoidance operations, such as stopping the drive system 330a, 330b and requesting further instructions from the fleet management system 120 and/or a human operator. The detection range regions 702a to 702c can be used by the vehicle processor 212 to avoid triggering collision avoidance operations that lead to downtime and/or human intervention.

Although only three detection range regions are shown in FIGS. 7A and 7B, fewer or more detection range regions 702a-702c can be defined by the vehicle processor 212. In some embodiments, the vehicle processor 212 can vary the number of detection range regions 702a-702c during operation of the autonomous material transport vehicle 300. As described with reference to FIGS. 5A and 5B, the dimensions of the detection range regions 702a-702c can vary depending on various factors (e.g., operation and/or type of the autonomous material transport vehicle 300, the operating environment, etc.). The characteristics of each detection range region 702a-702c can also vary with respect to each other. For example, the detection range region 702a can have a different width than the detection range region 702b. Similarly, the detection range region 702b can have a different boundary shape than the detection range regions 702a and 702c.

Continuing with reference to FIG. 4, at 408, the vehicle processor 212 can trigger the collision avoidance operation to prevent, or at least minimize, the impact of collision between the autonomous material transport vehicle 300 and the object 620. Depending on the operation of the autonomous material transport vehicle 300, the vehicle processor 212 can trigger one or more collision avoidance operations.

For example, the collision avoidance operation can include an operation to immediately stop the autonomous material transport vehicle 300 by cutting power to the drive motor 330b in response to the sensing system 320 detecting the object 620.

In some embodiments, the vehicle processor 212 can operate the vehicle to navigate around the object 620, such as controlling the steering module 330a to navigate around the object 620 (e.g., avoidance steering) or to proceed on an alternative path, and/or operating the drive motor 330b to adjust an operating speed (e.g., slow down) of the autonomous material transport vehicle 300 to enable the vehicle processor 212 to determine an avoidance maneuver to avoid the object 620. The avoidance maneuver can include an updated path and/or an avoidance navigation with instructions for returning the autonomous material transport vehicle 300 to the original path. For example, the vehicle processor 212 can notify the fleet management system 120 of the object 620, and receive rerouting instructions from the fleet management system 120 around the object 620. In some embodiments, the vehicle processor 212 can proceed to operate the autonomous material transport vehicle 300 to the destination location 402 following completion of the collision avoidance operation at 408. For example, the vehicle processor 212 can apply information collected by the sensing system 220 to navigate the autonomous material transport vehicle 300 around the object 620 and continue to guide the autonomous material transport vehicle 300 towards the destination location thereafter.

The vehicle processor 212 can determine the collision avoidance operation based on various factors, including, but not limited to, whether the autonomous material transport vehicle 300 is transporting a load, the sensitivity of the carried load, the urgency of the operation, the operational limits of the autonomous material transport vehicle 300, as well as constraints resulting from the surrounding environment.

For example, when the vehicle processor 212 determines that the autonomous material transport vehicle 300 is not carrying a load, the vehicle processor 212 can prioritize reaching its destination location 402 sooner over needing to minimize a risk of collision. When the vehicle processor 212 determines that a collision is imminent, the vehicle processor 212 can determine the collision avoidance operation is to control the steering module 330a to navigate around the object 620. In contrast, when the vehicle processor 212 determines that the autonomous material transport vehicle 300 is carrying a load, the vehicle processor 212 can prioritize an operation to minimize the risk of collision since the load could be damaged in a collision. The vehicle processor 212, therefore, can determine that the collision avoidance operation is to immediately stop the autonomous material transport vehicle 300, such as by cutting power to the drive motor 330b.

When the autonomous material transport vehicle 300 is carrying a load, the vehicle processor 212 can also consider the sensitivity of the load when determining the collision avoidance operation. For low sensitivity loads (e.g., non-fragile, non-dangerous and/or less valuable loads), the vehicle processor 212 can determine that the collision avoidance operation involves navigating around the object 620, or slowing down the autonomous material transport vehicle 300 to allow for determination of an avoidance maneuver. In contrast, for highly sensitive loads (e.g., fragile, dangerous and/or valuable loads), the vehicle processor 212 can prioritize prevention of any risk of damage to the load, and can then determine the collision avoidance operation is to immediately stop the vehicle.

The vehicle processor 212 can also consider the urgency of its assigned operation when determining the collision avoidance operation. For high urgency tasks, the vehicle processor 212 can avoid triggering collision avoidance operations that lead to long downtime and/or human intervention. For example, the vehicle processor 212 can avoid stopping the autonomous material transport vehicle 300 by cutting power to the drive motor 330b. In contrast, for low urgency tasks, the vehicle processor 212 may have greater freedom to select between operations that can delay the completion of the assigned operation, such as stopping the autonomous material transport vehicle 300 and/or slowing down the autonomous material transport vehicle 300 to determine the avoidance maneuver.

The vehicle processor 212 can also consider vehicle operational constraints, as well as environmental constraints, when determining a suitable collision avoidance operation. Vehicle operational constraints can include, but not limited to, limits on the autonomous material transport vehicle's 300 ability to safely perform certain collision avoidance maneuvers. For example, in cases where the autonomous material transport vehicle 300 is travelling at high speeds, the autonomous material transport vehicle 300 may not be able to safely perform an immediate stop. That is, immediately stopping the autonomous material transport vehicle 300 at high speeds may destabilize the autonomous material transport vehicle 300 and/or dislodge its load. When the vehicle processor 212 determines that the autonomous material transport vehicle 300 is travelling at high speeds, the vehicle processor 212 can prioritize navigating around the object 620 and/or slowing down the autonomous material transport vehicle 300 to minimize collision, rather than cutting power to the drive motor 330b. The vehicle processor 212 can consider the breaking force of the autonomous material transport vehicle 300, the autonomous material transport vehicle's 300 deceleration speed, as well as the operating condition of the autonomous material transport vehicle's 300 mechanical and/or electrical components (e.g., age, historical usage, etc.) when determining whether or not the autonomous material transport vehicle 300 is safely capable of performing an avoidance maneuver.

When the collision avoidance operation involves navigating around an obstacle (e.g., avoidance steering), the vehicle processor 212 can also define operational constraints that limit the range of navigational maneuvers for the autonomous material transport vehicle 300. For example, at higher travelling speeds, the autonomous material transport vehicle 300 may not be capable of safely performing sharp turns to steer around the object 620. Performing sharp turns at high travelling speeds may result in the autonomous material transport vehicle 300 losing balance or even causing the autonomous material transport vehicle 300 to roll over. At higher travelling speeds, the vehicle processor 212 may control the steering module 330a to perform wider turns around the object 620. At lower travelling speeds, the vehicle processor 212 can operate the autonomous material transport vehicle 300 to perform wider or narrower turns.

Environmental constraints can also limit the range of safe collision avoidance operations determined by the vehicle processor 212. For example, in compact operating environments (e.g., narrow or dense operating environments), the autonomous material transport vehicle 300 may be required to perform sharp turns to navigate around the object 620. For autonomous material transport vehicles 300 that are not operationally capable of performing sharp turns, the vehicle processor 212 may determine the avoidance collision operation is to stop the vehicle, or otherwise, slow down the autonomous material transport vehicles 300 to allow for determination of an avoidance maneuver. In contrast, the vehicle processor 212 can have greater options for choosing collision avoidance maneuvers in more accommodating operating environments.

In some embodiments, the fleet management system 120 and/or the vehicle processor 212 can update the electronic map of the operating environment to reflect the presence of the object 620 detected at 406.

Figure 8:
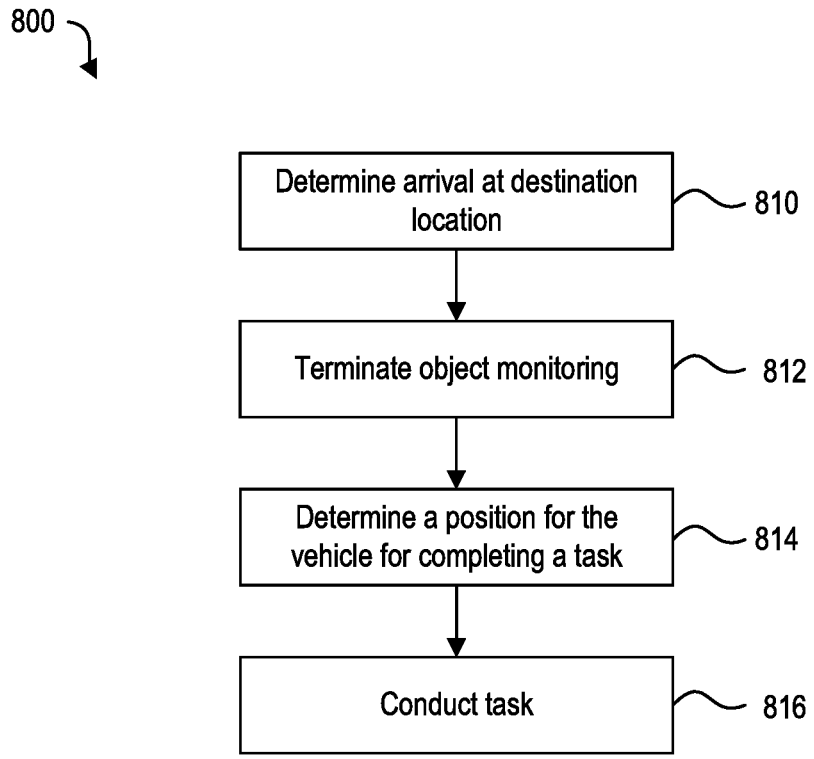
FIG. 8 is a flowchart illustrating an example method for positioning an autonomous material transport vehicle for completing a task.

Reference will now be made to FIG. 8, which is a flowchart of an example method 800 for positioning the autonomous material transport vehicle 300 for completing a task. For illustrative purposes, reference will be made to FIGS. 9A to 11C.

At 810, the vehicle processor 212 can determine whether the autonomous material transport vehicle 300 has arrived at the destination location.

Figure 9A:
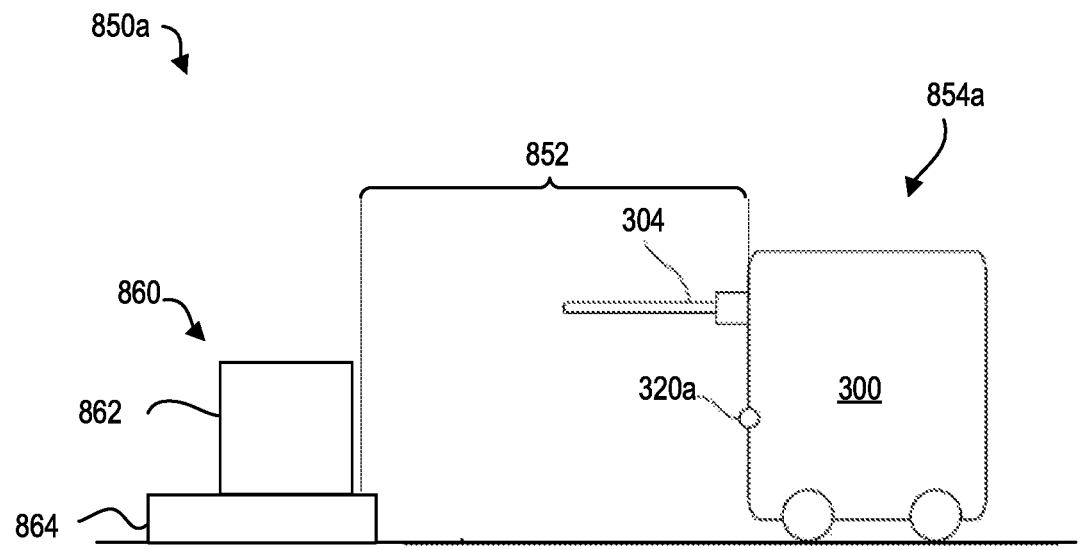
FIG. 9A is a schematic representation of an example autonomous material transport vehicle pick up during an example operation.

FIG. 9A shows a schematic representation 850a illustrating the autonomous material transport vehicle 300 arriving at the destination location, generally shown at 860, where a load 862 is located on a loading platform 864. The autonomous material transport vehicle 300 can be in a travelling mode 854a with the forks 304 lifted. During the travelling mode 854a, the sensor 320a can benefit from better visibility as the forks 304 are not obstructing the sensor 320a. The loading platform 864 can be a shipping pallet or a skid, for example. The loading platform 864 is located within the detection range 852 of the autonomous material transport vehicle 300. The vehicle processor 212 can determine the autonomous material transport vehicle 300 arrived at the destination location 860 based on the detection of the loading platform 864 of the load 862 within the detection range 852, for example. In this example embodiment, the destination location 860 is where the load 862 to be picked up is located. In other embodiments, the destination location 860 can be where a load 862 is to be dropped off. In some embodiments, the vehicle processor 212 can proceed with method 800 after determining the autonomous material transport vehicle 300 has arrived at the destination location at 410.

The vehicle processor 212 can determine the autonomous material transport vehicle 300 has arrived at the destination location 860 based on information collected by the sensing system 220. For example, the destination location 860 can be defined by coordinates and the vehicle processor 212 can determine the location of the autonomous material transport vehicle 300 satisfies the coordinates of the destination location 860 based on data collected by a location sensor within the sensing system 220. In another example, the sensing system 220 can collect image and/or video data from its operating environment and the vehicle processor 212 can determine from the image and/or video data that the autonomous material transport vehicle 300 has arrived at the destination location 860. For example, the vehicle processor 212 can identify the relevant landmarks from the image data and determine that the autonomous material transport vehicle 300 has arrived at the destination location 860. The landmarks can include location identifiers within the operating environment, which can assist the vehicle processor 212 in self-locating with reference to an electronic map of the operating environment. The landmarks can include visual indicators (e.g., corner tape, or graphic patterns) which identify the associated location. The visual indicators can be located at various locations, such as on the ground, for example. The landmarks can also include the load 862 itself, which can include load identifiers that can be captured by the sensing system 220 and from which the vehicle processor 212 can determine that the autonomous material transport vehicle 300 has arrived at the destination location 860.

At 812, after determining that the autonomous material transport vehicle 300 has arrived at the destination location 860, the vehicle processor 212 can discontinue the sensing system 220 from monitoring for objects (at 404 of method 400, for example).

As the autonomous material transport vehicle 300 has arrived at the destination location, the vehicle processor 212 can cease monitoring for possible collisions. To conserve power and computing resources, the vehicle processor 212 can cease operation of the sensors within the sensing system 220 being used for monitoring for unexpected objects, or, in the case that a sensing processor is used, cease operation of the sensing processor and/or discontinue supplying power to the sensing processor. In the embodiments in which the sensing processor can control the operation of the drive system directly 230, the vehicle processor 212 can terminate communication between the sensing processor and the drive system 230 so that the sensing processor cannot control the drive system 230. In some embodiments, the vehicle processor 212 can continue to receive data from the sensing system 220 related to monitoring of unexpected objects but disregard the data.

Figure 9B:
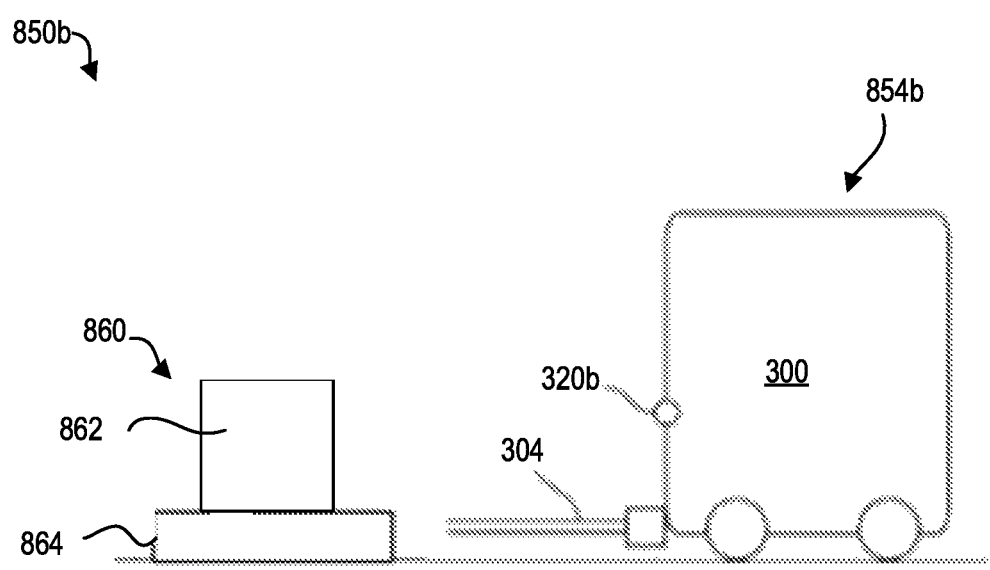
FIG. 9B shows schematic representation of FIG. 9A at a later stage of the example operation.

As shown in FIG. 9B, the vehicle processor 212 can terminate the operation of the sensor 320a for monitoring for unexpected objects as the autonomous material transport vehicle 300 has arrived at the destination location 860. The autonomous material transport vehicle 300 can enter a task mode 854b, which in this example is to pick up the load 862 and so, the forks 304 are lowered.

For example, as will be described with reference to FIGS. 10A to 10D, the vehicle processor 212 can operate the fork elevator 306 to lower from a travelling height during the travelling mode 854a to a task height for the task mode 854b. While in the task mode 854b, the vehicle processor 212 can operate the autonomous material transport vehicle 300 to approach the load 862 without triggering a collision avoidance operation. The task height can vary depending on the relative position of the loading platform 864. As will be described, in this example, the vehicle processor 212 operates the fork elevator 306 so that the forks 304 can be engaged with slots of the loading platform 864.

Figure 10A:
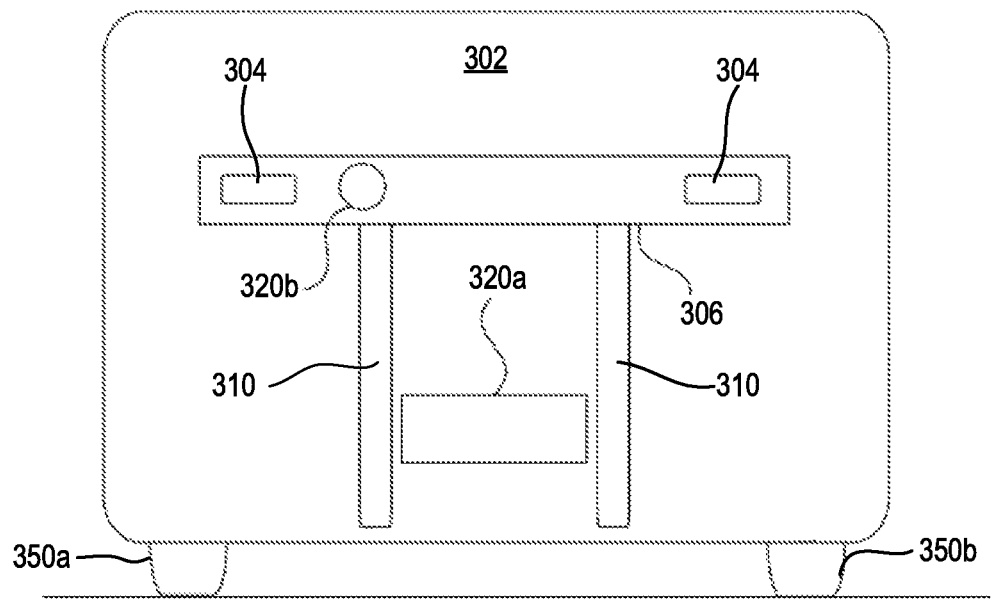
FIG. 10A is a front view of the autonomous material transport vehicle of FIG. 3 with the forks at a highest position.
Figure 10B:
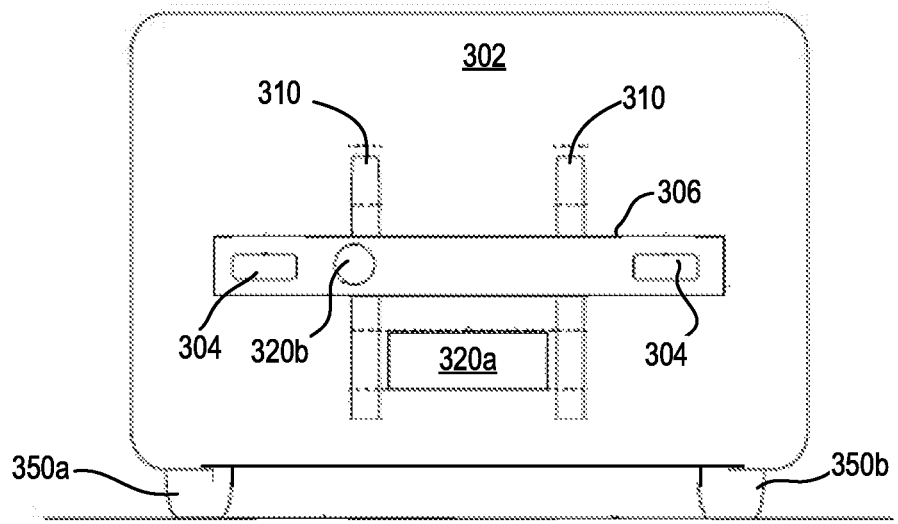
FIG. 10B shows the forks of the autonomous material transport vehicle of FIG. 10A at a first intermediate position.
Figure 10C:
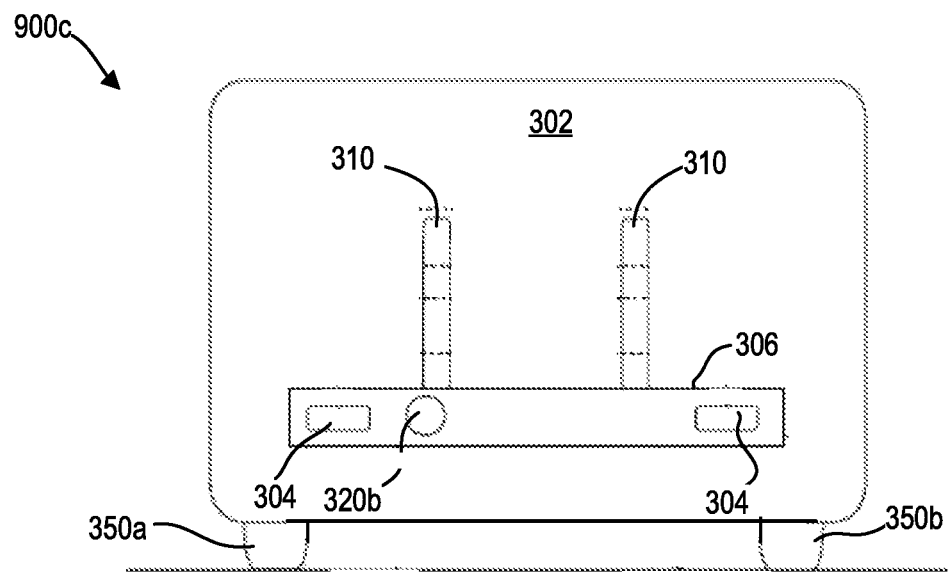
FIG. 10C shows the forks of the autonomous material transport vehicle of FIG. 10A at a second intermediate position.
Figure 10D:
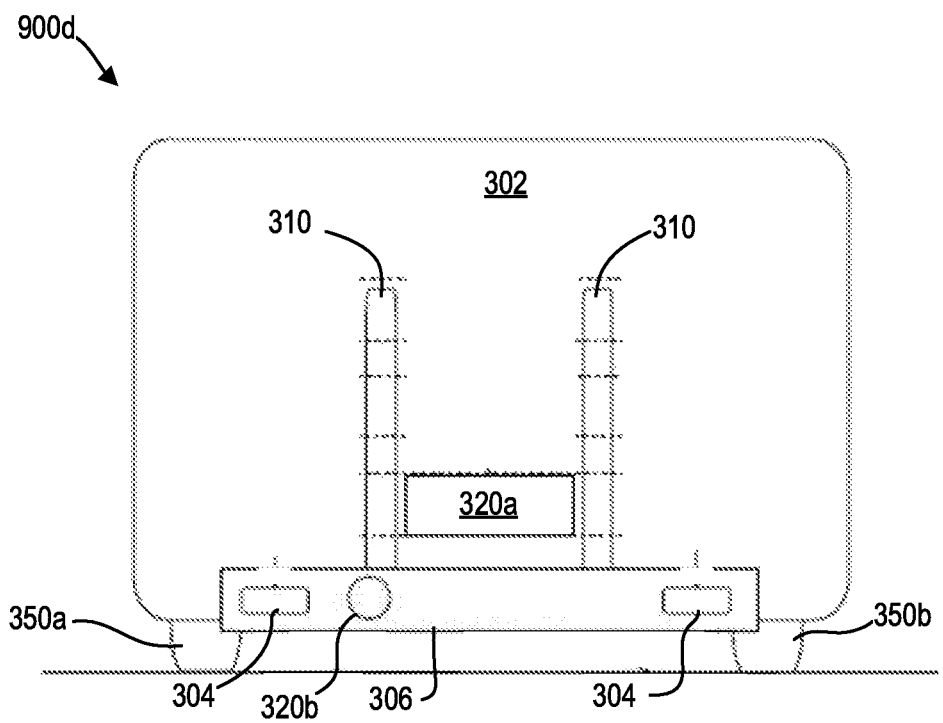
FIG. 10D shows the forks of the autonomous material transport vehicle of FIG. 10A at a lowest position.

FIGS. 10A to 10D show a front view of the autonomous material transport vehicle 300 with the forks 304 at different positions. FIG. 10A shows, at 900a, the forks 304 at the highest position of the elevator rails 310 (e.g., the travelling height). FIG. 10B shows, at 900b, the forks 304 at a first intermediate position; FIG. 10C shows, at 900c, the forks 304 at a second intermediate positon; and FIG. 10C shows the forks 304 at a lowest position of the elevator rails 310. As shown in FIGS. 10B to 10D, while the fork elevator 306 descends, the fork elevator 306 may enter the detection range 852 of the sensor 320a (and even obstruct the sensor 320a as in FIG. 10C) and so, it can be important to disable the operation of the sensor 320a for monitoring for unexpected objects during at least the movement of the fork elevator 306.

During completion of other tasks, the vehicle processor 212 can operate the forks 304 differently depending on the task to be completed.

In some embodiments, the vehicle processor 212 can continue to operate the sensing system 220 to monitor for unexpected objects when the autonomous material transport vehicle 300 has arrived at the destination location 860. This can be particularly important in an operating environment that has heavy traffic. The vehicle processor 212 can disregard any data from the sensing system 220 related to the load 862 and loading platform 864.

At 814, the vehicle processor 212 can determine a position for the autonomous material transport vehicle 300 for completing the task. The position can include an orientation of the autonomous material transport vehicle 300 relative to the load 862 and/or loading platform 864. Based on the position determined at 814, the vehicle processor 212 can then determine a load receiving maneuver for positioning the autonomous material transport vehicle 300 into a load receiving position. The load receiving maneuver can be determined from segmented image data associated with the load 862 and/or loading platform 864.

In the example shown in FIGS. 9A and 9B, the task relates to picking up the load 862 at the destination location 860.

Figure 11A:
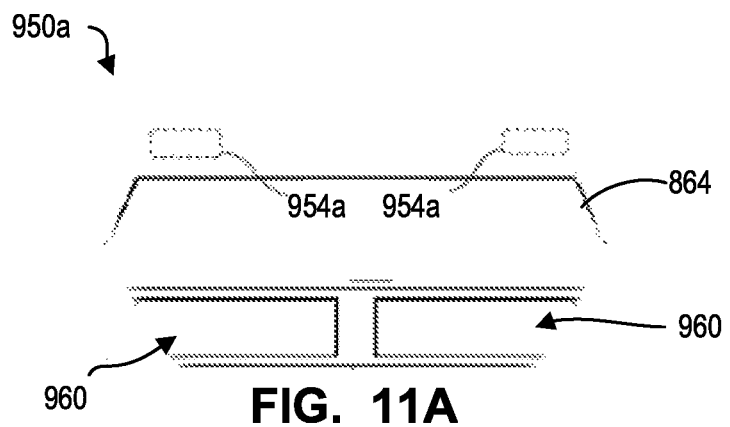
FIG. 11A is an example image of a loading platform.
Figure 11B:
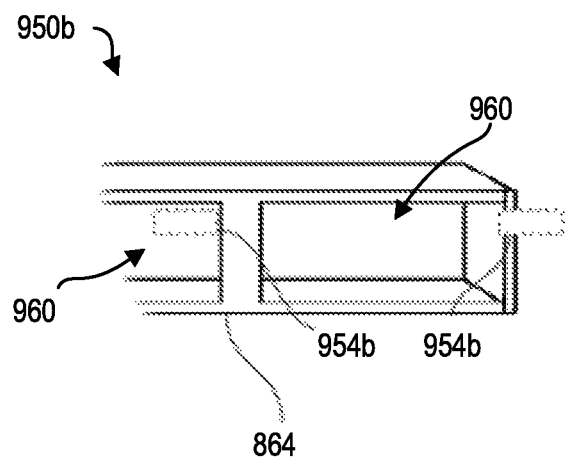
FIG. 11B is another example image of the loading platform of FIG. 11A.
Figure 11C:
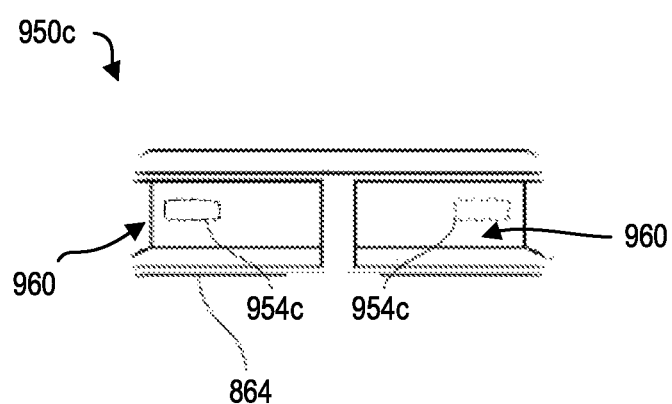
FIG. 11C is another example image of the loading platform of FIG. 11A.

FIGS. 11A to 11C show example images 950a to 950c of the loading platform 864 as captured by the sensing system 220. As described, the vehicle processor 212 can operate the sensing system 220 to capture image and/or video data of operating environment. The vehicle processor 212 can identify the load 862 from the image and/or video data and determine the position of the autonomous material transport vehicle 300 relative the load 862 for picking up the load 862. For example, the vehicle processor 212 can determine an orientation of the load 862 from the image and/or video data collected by the sensing system 220 and identify the lifting elements (e.g., slots, gaps, etc.) of the load 862 or loading platform 864 with which the forks 304 can engage for completing the task.

In some embodiments, the vehicle processor 212 can process the image and/or video data to determine the characteristics of the load 862 and/or loading platform 864 by applying various image processing techniques, such as, but not limited to, image segmentation. Image segmentation involves classifying pixels within an image and labelling the pixels within the image. Image segmentation can involve trainable or non-trainable algorithms.

Trainable segmentation algorithms can involve developing a convolutional neural network (CNN) based on a set of training images that are preprocessed with the relevant labels. The set of training images can be stored in the system data storage 140 and/or vehicle data storage 214. In the methods disclosed herein, the fleet management system 120 can operate to develop a convolutional neural network based on a set of training images of various loads and loading platforms, as well as images of various different lifting elements of the loads and loading platforms. With the convolutional neural network built on these sets of training images, the vehicle processor 212 can trigger the image processing algorithms based on these convolutional neural networks. The image and/or video data collected by the sensing system 220 can be processed with the convolutional neural networks to identify the relevant features of the loads and loading platforms. Example approaches to developing the convolutional neural network can include, but not limited to, sliding path-based approach, super-pixel-based approach, pixel-based approach, weakly-supervised approach, or fully supervised approach.

Non-trainable segmentation algorithms can involve, but not limited to, algorithms based on local binary patterns (LBP), or pre-trained convolutional neural network via transferable learning, wavelet filters, image differential filters and Gabor filters.

The vehicle processor 212 can trigger the image processing involving image segmentation algorithms disclosed here to the image and/or video data collected by the sensing system 220 to classify the pixels correspond to the load 862 and the loading platform 864. For the pixels identified as the loading platform 864, the vehicle processor 212 can then identify the pixels corresponding to the lifting elements. In some embodiments, the image processing may take place at the fleet management system 120 to offload processing resources from the vehicle processor 212. The results of the image processing can then be transmitted from the fleet management system 120 to the vehicle processor 212. Based on the results of the image segmentation algorithm, the vehicle processor 212 can operate the drive system 330a, 330b to align the forks 304 with the lifting elements of the load 862.

FIG. 11A shows fork profiles 954a (in broken lines) that correspond to the position of the forks 304. It can be seen that the forks 304 are positioned too high above the loading platform 864 and would not engage the slots 960 of the loading platform 864 if the forks 304 are extended forward. After the sensing system 220 provides the image 950a to the vehicle processor 212, the vehicle processor 212 can trigger the image processing of the image 950a to determine the position of the slots 960. For the example shown in FIG. 11A, the vehicle processor 212 can determine, from the results of the image processing, that the fork elevator 306 needs to be operated to lower the forks 304 in order to align the forks 304 with the slots 960.

FIG. 11B shows fork profiles 954b of the forks 304 in a different position relative to the loading platform 864. As can be seen, the forks 304 are laterally offset from the slots 960. The vehicle processor 212 can then determine, from the results of the image processing of the image 950b, that the drive system 330a, 330b needs to be operated to align the forks 304 with the slots 960.

FIG. 11C shows fork profiles 954c of the forks 304 in another position relative to the loading platform 864. As can be seen, the forks 304 are aligned with the slots 960. The vehicle processor 212 can then determine, from the results of the image processing of the image 950c, that the forks 304 can be engaged with the slots 960 to pick up the loading platform 864 and the load 862 (not shown) to conduct the task (816).

Figure 12:
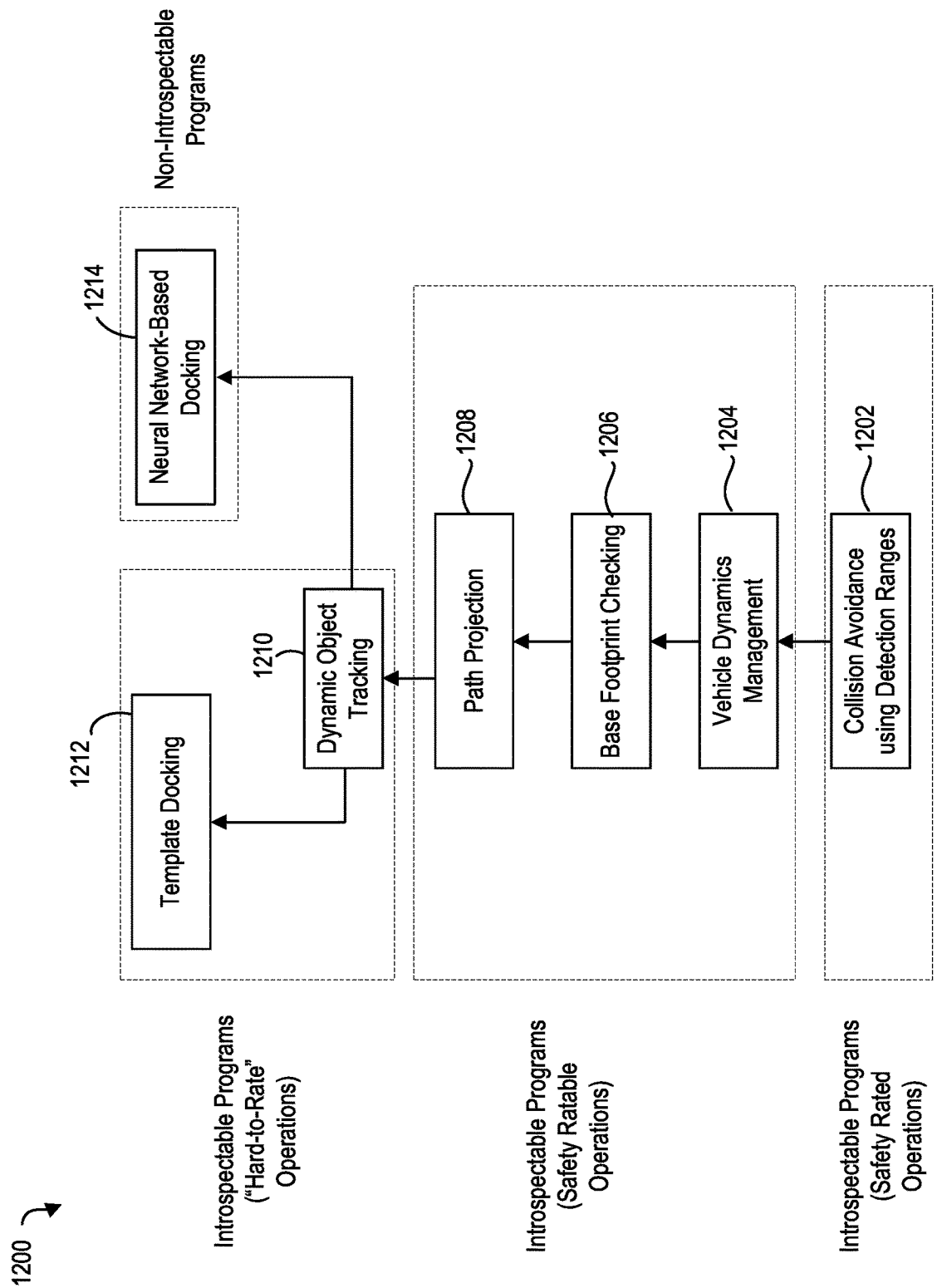
FIG. 12 is a block diagram illustrating example safety layers of an example autonomous material transport vehicle.

Reference will now be made to FIG. 12, which is a block diagram 1200 illustrating example safety layers defined for the vehicle processor 212.

The vehicle processor 212 may be operated to carry out different navigational operations by executing instructions (e.g., software programs) stored in the vehicle data storage 214. The software programs executed by the vehicle processor 212 can include introspectable software programs (e.g., "white box" programs), as well as non-introspectable software programs (e.g., "black box" programs). Introspectable software programs can enable inspection of a program's input and output parameters, as well as inspection of the program's internal logic. Non-introspectable programs can also enable inspection of input and output parameters, however, the program's internal logic is opaque (e.g., not inspectable).

Operations conducted in accordance with and/or triggered by introspectable software programs can include operations which are safety-rated, operations which are safety-ratable, and/or operations which are difficult to safety rate.

Safety-rated operations can include low-level operations which have a direct and measurable effect on the ability of a transport vehicle 300 to avoid immediate collision with objects in the surrounding environment. Examples of safety-rated operations can include collision avoidance operations using detection ranges 1202. For example, the vehicle processor 212 can operate the sensing system 200 to monitor for objects within a detection range, and a collision avoidance operation may be triggered when an object is detected within the detection range.

Safety-ratable operations can include higher-level operations which involve determining a suitable collision avoidance operation from a number of possible alternatives, as well as operations involving route planning to avoid possible collisions. Safety-ratable operations can include, for example, vehicle dynamic management 1204, base footprint checking 1206, and path projection 1208.

Vehicle dynamic management 1204 can involve determining, by the vehicle processor 212, a suitable collision avoidance operation having regard to factors, including, but not limited to, whether the autonomous material transport vehicle is transporting a load, the sensitivity of the carried load, the urgency of a tasked operation, as well as the operational limits of the autonomous material transport vehicle 300.

Base foot print checking 1206 can involve determining, by the vehicle processor 212, a suitable collision avoidance operation having regard to environmental constraints, including the presence of objects or obstacles within the immediate vicinity of the transport vehicle 300. For example, base foot print checking 1206 may be required when the vehicle is operating in compact environments.

Path projection 1208 can involve determining whether a path or route of the transport vehicle 300, may result in a collision with surrounding objects. In cases where a path or route may result in a collision, the vehicle processor 212 may determine a new route for the vehicle 300, or otherwise, may stop or slow down the vehicle to allow for determination of an alternative route.

In contrast to safety-rated and safety-ratable operations, operations which are difficult to safety rate (e.g., "hard-to-rate" operations) can include operations that have an indirect, and difficult to assess, effect on the ability of a material transport vehicle 300 to avoid collisions with objects in the surrounding environment. Examples of operations which are difficult to safety rate include dynamic object tracking 1212 and template docking 1214 operations.

Dynamic object tracking operations 1210 can involve monitoring, by the vehicle processor 212, mobile or immobile objects (and/or targets) within the vehicle's surrounding environment. In various cases, the monitoring can be performed using the sensing system 220. In some cases, the vehicle processor 212 can communicate information about sensed objects to other material transport vehicles 300 operating within the same environment.

Template docking 1212 can involve identifying, and tracking, by the vehicle processor 212, visual indicators in the vehicle's surrounding environment that identify load pick-up and drop-off locations. The identification and tracking of visual indicators may also be performed with the assistance of the sensing system 220.

Operations which are difficult to safety rate can also include operations performed in accordance with non-introspectable programs (e.g., "black box" programs). Examples of operations carried-out by non-introspectable programs include neural networking-based docking operations 1216. Neural network-based docking operations can involve processing, by the vehicle processor 212, images and/or video data collected by sensing system 220 to determine characteristics of a load and/or loading platform requiring pick-up.

In various cases, lower operational layers in block diagram 1200 can provide suggestions, or assistance, to higher operational layers. For instance, dynamic object tracking 1210 can assist a neural network-based docking 1214 operation by identifying target objects in the vehicle's surrounding environment which correspond to loads or loading platforms requiring pick-up. Similarly, dynamic object tracking 1210 can be used for identifying or tracking specific target visual indicators, located in the surrounding environment, corresponding to load pick-up or drop-off locations. In some cases, lower operational layers can also override higher operational layers. For example, safety-rated and safety-ratable operations can be used for preventing collisions with surrounding objects while the vehicle processor 212 is attempting to perform template or neural network-based docking.

Unless the context requires otherwise, throughout the specification and claims which follow, the word "comprise" and variations thereof, such as, "comprises" and "comprising" are to be construed in an open, inclusive sense, that is as "including, but not limited to." It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies. In addition, as used herein, the wording "and/or" is intended to represent an inclusive or. That is, "X and/or Y" is intended to mean X or Y or both, for example. As a further example, "X, Y, and/or Z" is intended to mean X or Y or Z or any combination thereof. It should be noted that the term "coupled" used herein indicates that two elements can be directly coupled to one another or coupled to one another through one or more intermediate elements.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software that is written in a high-level computer programming language such as one that employs an object-oriented paradigm. Accordingly, the program code may be written in Java, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as describing exemplary implementations. Various modification and variations may be made to these example embodiments without departing from the spirit and scope of the invention, which is limited only by the appended claims.

The invention claimed is:

1. An autonomous material transport vehicle comprising:
a sensing system operable to monitor an environment of the vehicle, the sensing system comprising a sensing processor and one or more sensors;
a drive system for operating the vehicle;
a vehicle processor in communication with the sensing system and the drive system, the vehicle processor being operationally independent from the sensing processor, the vehicle processor operable to:
receive a location of a load;
initiate the drive system to navigate the vehicle to the location;
following initiation of the drive system, operate the sensing processor to monitor for one or more objects within a detection range; and
automatically operate the drive system to position the vehicle for transporting the load in response to receiving an alert from the sensing processor indicating the one or more objects comprises the load; and
the sensing processor operable to:
determine whether the one or more objects within the detection range comprises the load; and
in response to determining the one or more objects comprises the load, alerting the vehicle processor of the load and ceasing operation of the sensing system, otherwise,
receive one or more sensor inputs from the one or more sensors; and
generate a collision avoidance control signal based on the one or more sensor inputs to control the drive system to avoid the one or more objects, the collision avoidance control signal overriding control of the drive system by the vehicle processor.

2. The vehicle of claim 1, wherein the one or more of the vehicle processor and the sensing processor is operable to terminate power supply to the drive system to avoid the one or more objects.

3. The vehicle of claim 1, wherein the one or more of the vehicle processor and the sensing processor is operable to stop the drive system from navigating the vehicle in order to avoid the one or more objects.

4. The vehicle of claim 1, wherein the one or more of the vehicle processor and the sensing processor is operable to determine an avoidance maneuver that avoids the one or more object.

5. The vehicle of claim 4, wherein the avoidance maneuver comprises an alternative path to the location.

6. The vehicle of claim 4, wherein the one or more of the vehicle processor and the sensing processor is operable to adjust an operating speed of the vehicle to accommodate the determination of the avoidance maneuver.

7. The vehicle of claim 1, wherein the one or more of the vehicle processor and the sensing processor is operable to:
determine a depth and an angular sweep for the detection range.

8. The vehicle of claim 1, wherein the one or more of the vehicle processor and the sensing processor is operable to:
determine an operating speed of the vehicle; and
define the detection range based at least on the operating speed of the vehicle.

9. The vehicle of claim 1, wherein the detection range comprises two or more regions.

10. The vehicle of claim 1, wherein the vehicle processor is operable to:
initiate the sensing system to collect image data of the environment of the vehicle following initiation of the drive system, and to determine from the collected image data whether the load is within the detection range.

11. The vehicle of claim 10, wherein the sensing processor is operable to:
conduct image segmentation to the collected image data to determine whether the load is within the detection range.

12. The vehicle of claim 11, wherein the sensing processor is operable to:
conduct the image segmentation based on a load dataset developed from applying a neural network to a load training dataset related to the load, the load dataset being stored in a data storage accessible by the one or more of the vehicle processor and the sensing processor.

13. The vehicle of claim 1, wherein the one or more of the vehicle processor and the sensing processor is operable to:
determine the load is within the detection range based on a location of the vehicle.

14. The vehicle of claim 1, wherein the vehicle processor is operable to position the vehicle for transporting the load by:
operating the sensing system to collect image data of the environment of the vehicle;
conducting image segmentation on the collected image data to identify the load; and
determining a load receiving maneuver for positioning the vehicle into a load receiving position based on the segmented image data of the load.

15. The vehicle of claim 14, wherein the vehicle processor is operable to:
conduct the image segmentation based on a load dataset developed from applying a neural network to a load training dataset related to the load, the load dataset being stored in a data storage accessible by the one or more of the vehicle processor and the sensing processor.

16. The vehicle of claim 1, wherein the sensing processor is operable to control the drive system when determining a collision avoidance operation, and to return control of the drive system to the vehicle processor when the collision avoidance operation is complete.

17. The vehicle of claim 1, wherein the sensing system comprises at least one optical sensor.

18. The vehicle of claim 1, wherein the sensing system comprises at least one time of flight sensor.

19. The vehicle of claim 1, wherein the sensing system is operable to generate the collision avoidance control signal based on a sensitivity of a current load being carried by the vehicle.

20. The vehicle of claim 1, wherein the sensing processor comprises a low-level processor operable to receive the one or more sensor inputs and generate the collision avoidance control signal for controlling the drive system.

* * * * *